United States Patent
Ferencz et al.

(10) Patent No.: US 10,317,231 B2
(45) Date of Patent: Jun. 11, 2019

(54) TOP-DOWN REFINEMENT IN LANE MARKING NAVIGATION

(71) Applicant: Mobileye Vision Technologies Ltd., Jerusalem (IL)

(72) Inventors: Andras Ferencz, Munich (DE); Pini Reisman, Jerusalem (IL)

(73) Assignee: Mobileye Vision Technologies Ltd., Jerusalem (IL)

(*) Notice: Subject to any disclaimer, the term of this patent is extended or adjusted under 35 U.S.C. 154(b) by 0 days.

(21) Appl. No.: 14/736,057

(22) Filed: Jun. 10, 2015

(65) Prior Publication Data
US 2015/0354976 A1    Dec. 10, 2015

Related U.S. Application Data

(60) Provisional application No. 62/173,216, filed on Jun. 9, 2015, provisional application No. 62/010,003, filed on Jun. 10, 2014.

(51) Int. Cl.
*G06K 9/00* (2006.01)
*B60W 30/12* (2006.01)
(Continued)

(52) U.S. Cl.
CPC ......... *G01C 21/3602* (2013.01); *B60W 30/12* (2013.01); *G05D 1/0251* (2013.01);
(Continued)

(58) Field of Classification Search
None
See application file for complete search history.

(56) References Cited

U.S. PATENT DOCUMENTS 2,986,732 A * 5/1961 Marshburn ............. G01S 1/304
                                              342/395
4,970,653 A * 11/1990 Kenue ................... G05D 1/0246
                                              348/116
(Continued)

FOREIGN PATENT DOCUMENTS

DE    102016209232 A1    11/2017
EP    2 325 824 A1    5/2011
(Continued)

OTHER PUBLICATIONS

International Search Report and Written Opinion dated Jan. 8, 2016, directed to International Application No. PCT/IL2015/050833; 8 pages.
(Continued)

*Primary Examiner* — Nancy Bitar
(74) *Attorney, Agent, or Firm* — Schwegman Lundberg & Woessner, P.A.

(57) ABSTRACT

Systems and methods use cameras to provide autonomous navigation features. In one implementation, top-down refinement in lane marking navigation is provided. The system may include one or more memories storing instructions and one or more processors configured to execute the instructions to cause the system to receive from one or more cameras one or more images of a roadway in a vicinity of a vehicle, the roadway comprising a lane marking comprising a dashed line, update a model of the lane marking based on odometry of the one or more cameras relative to the roadway, refine the updated model of the lane marking based on an appearance of dashes derived from the received one or more images and a spacing between dashes derived from the received one or more images, and cause one or more navigational responses in the vehicle based on the refinement of the updated model.

22 Claims, 40 Drawing Sheets

(51) Int. Cl.
*G01C 21/36* (2006.01)
*G06K 9/32* (2006.01)
*G06K 9/62* (2006.01)
*G05D 1/02* (2006.01)

(52) U.S. Cl.
CPC ....... *G05D 1/0253* (2013.01); *G06K 9/00798* (2013.01); *G06K 9/3241* (2013.01); *G06K 9/6203* (2013.01); *G05D 2201/0213* (2013.01)

(56) References Cited

U.S. PATENT DOCUMENTS

| | | | | |
|---|---|---|---|---|
| 5,765,116 | A * | 6/1998 | Wilson-Jones | B62D 15/025 180/168 |
| 8,452,055 | B2 | 5/2013 | Stein et al. | |
| 8,803,966 | B2 * | 8/2014 | Zhang | G06K 9/00798 348/119 |
| 9,098,751 | B2 * | 8/2015 | Hilldore | G06K 9/00798 |
| 9,170,116 | B1 * | 10/2015 | Joshi | G01C 21/32 |
| 9,355,321 | B2 * | 5/2016 | Wujcicki | G01C 21/32 |
| 9,494,438 | B1 | 11/2016 | Ichinokawa | |
| 10,150,473 | B2 * | 12/2018 | Aharony | G06K 9/00798 |
| 2009/0174577 | A1 * | 7/2009 | Nakamura | G06K 9/00798 340/995.1 |
| 2010/0086174 | A1 * | 4/2010 | Kmiecik | G06K 9/00798 382/103 |
| 2010/0295668 | A1 * | 11/2010 | Kataoka | B62D 15/025 340/435 |
| 2012/0215399 | A1 * | 8/2012 | Jentz | G01M 3/025 701/32.8 |
| 2013/0208945 | A1 * | 8/2013 | Nunn | G06K 9/00798 382/103 |
| 2013/0253753 | A1 | 9/2013 | Burnette et al. | |
| 2014/0372020 | A1 | 12/2014 | Stein | |
| 2014/0379164 | A1 * | 12/2014 | Joh | G01C 21/30 701/1 |
| 2015/0086080 | A1 | 3/2015 | Stein et al. | |
| 2015/0103159 | A1 | 4/2015 | Shashua et al. | |
| 2015/0145965 | A1 | 5/2015 | Livyatan et al. | |
| 2015/0151725 | A1 | 6/2015 | Clarke et al. | |
| 2015/0151742 | A1 | 6/2015 | Clarke et al. | |
| 2015/0151751 | A1 | 6/2015 | Clarke et al. | |
| 2015/0151753 | A1 | 6/2015 | Clarke et al. | |
| 2015/0153735 | A1 | 6/2015 | Clarke et al. | |
| 2015/0353085 | A1 * | 12/2015 | Lee | B60W 30/10 701/533 |
| 2016/0167582 | A1 * | 6/2016 | Chen | G06K 9/00798 348/148 |

FOREIGN PATENT DOCUMENTS

| | | |
|---|---|---|
| EP | 3154835 A1 | 4/2017 |
| WO | WO 2001/80068 | 10/2001 |
| WO | WO 2008/130219 | 10/2008 |
| WO | WO 2013/141226 | 9/2013 |
| WO | 2015/189847 A1 | 12/2015 |
| WO | 2017/202570 A1 | 11/2017 |

OTHER PUBLICATIONS

International Search Report and Written Opinion dated Sep. 30, 2015, directed to International Application No. PCT/IL2015/050590; 10 pages.

International Preliminary Report on Patentability Received for PCT Application No. PCT/IL2015/050590, dated Dec. 22, 2016, 8 Pages.

Mobileye Wiki. "Road2 Refinement," located at <http://wiki/mw/index.php/Road2_Refinement.html> visted on Oct. 6, 2014. (3 pages).

"European Application Serial No. 15738138.5, Communication Purusant to Article 94(3) EPC dated Oct. 5, 2018", 5 pgs.

"European Application Serial No. 15738138.5, Response filed Aug. 18, 2017 to Communication pursuant to Rules 161(2) and 162 EPC dated Feb. 9, 2017", 18 pgs.

* cited by examiner

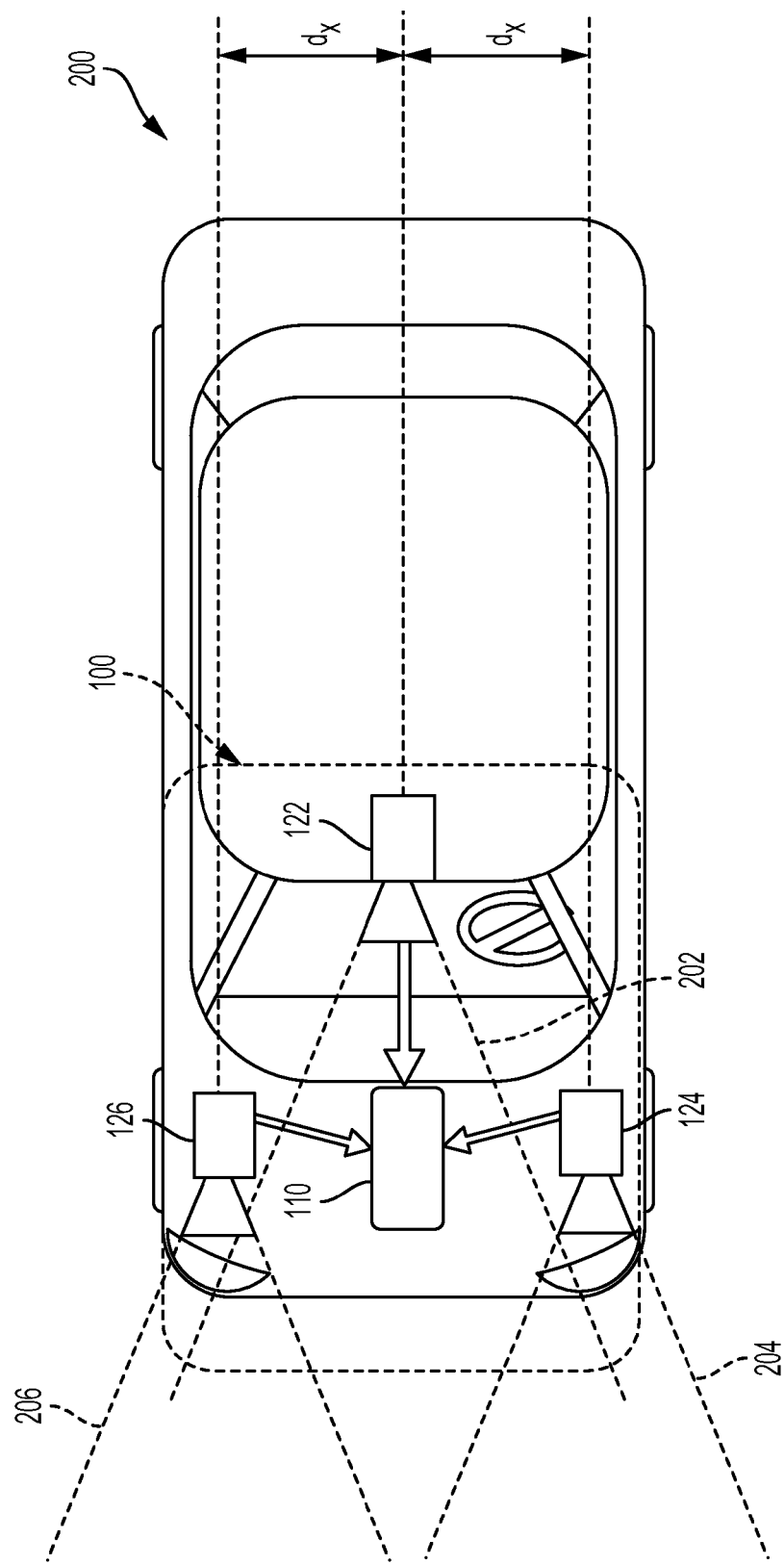

TOP-DOWN REFINEMENT IN LANE MARKING NAVIGATION

CROSS REFERENCE TO RELATED APPLICATIONS

This application claims the benefit of U.S. Provisional Patent Application No. 62/010,003, filed Jun. 10, 2014, and U.S. Provisional Patent Application No. 62/173,216, filed Jun. 9, 2015, the entireties of which are incorporated herein by reference.

FIELD OF THE DISCLOSURE

This relates generally to autonomous driving and/or driver assist technology and, more specifically, to systems and methods that use cameras to provide autonomous driving and/or driver assist technology features.

BACKGROUND

As technology continues to advance, the goal of a fully autonomous vehicle that is capable of navigating on roadways is on the horizon. Primarily, an autonomous vehicle may be able to identify its environment and navigate without input from a human operator. Autonomous vehicles may also take into account a variety of factors and make appropriate decisions based on those factors to safely and accurately reach an intended destination. For example, various objects—such as other vehicles and pedestrians—are encountered when a vehicle typically travels a roadway. Autonomous driving systems may recognize these objects in a vehicle's environment and take appropriate and timely action to avoid collisions. Additionally, autonomous driving systems may identify other indicators—such as traffic signals, traffic signs, and lane markings—that regulate vehicle movement (e.g., when the vehicle must stop and may go, a speed at which the vehicle must not exceed, where the vehicle must be positioned on the roadway, etc.). Autonomous driving systems may need to determine when a vehicle should change lanes, turn at intersections, change roadways, etc. As is evident from these examples, many factors may need to be addressed in order to provide an autonomous vehicle that is capable of navigating safely and accurately.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle and cause a navigational response based on an analysis of images captured by one or more of the cameras.

Consistent with a disclosed embodiment, top-down refinement in lane marking navigation is provided for a computer system. The system may include one or more memories storing instructions and one or more processors. The one or more processors may be configured to execute the instructions to cause the system to receive from one or more cameras one or more images of a roadway in a vicinity of a vehicle, the roadway comprising a lane marking comprising a dashed line, update a model of the lane marking based on odometry of the one or more cameras relative to the roadway, refine the updated model of the lane marking based on an appearance of dashes derived from the received one or more images and a spacing between dashes derived from the received one or more images, and cause one or more navigational responses in the vehicle based on the refinement of the updated model.

Consistent with another disclosed embodiment, top-down refinement in lane marking navigation is provided for a vehicle. The vehicle may include a body, one or more cameras configured to acquire one or more images of a roadway in a vicinity of a vehicle, the roadway comprising a lane marking comprising a dashed line, one or more memories storing instructions, and one or more processors. The one or more processors may be configured to execute the instructions to cause the vehicle to receive from one or more cameras the one or more acquired images of the roadway, update a model of the lane marking based on odometry of the one or more cameras relative to the roadway, refine the updated model of the lane marking based on an appearance of dashes derived from the received one or more images and a spacing between dashes derived from the received one or more images, and cause one or more navigational responses in the vehicle based on the refinement of the updated model.

Consistent with another disclosed embodiment, a method of top-down refinement in lane marking navigation is provided. The method may include receiving, by one or more processors, from one or more cameras one or more images of a roadway in a vicinity of a vehicle, the roadway comprising a lane marking comprising a dashed line, updating, by one or more processors, a model of the lane marking based on odometry of the one or more cameras relative to the roadway, refining, by one or more processors, the updated model of the lane marking based on an appearance of dashes derived from the received one or more images and a spacing between dashes derived from the received one or more images, and causing, by one or more processors, one or more navigational responses in the vehicle based on the refinement of the updated model.

BRIEF DESCRIPTION OF THE DRAWINGS

FIG. 2D is a diagrammatic top view representation of yet another embodiment of a vehicle including a system consistent with the disclosed embodiments.

DETAILED DESCRIPTION

Figure 1:
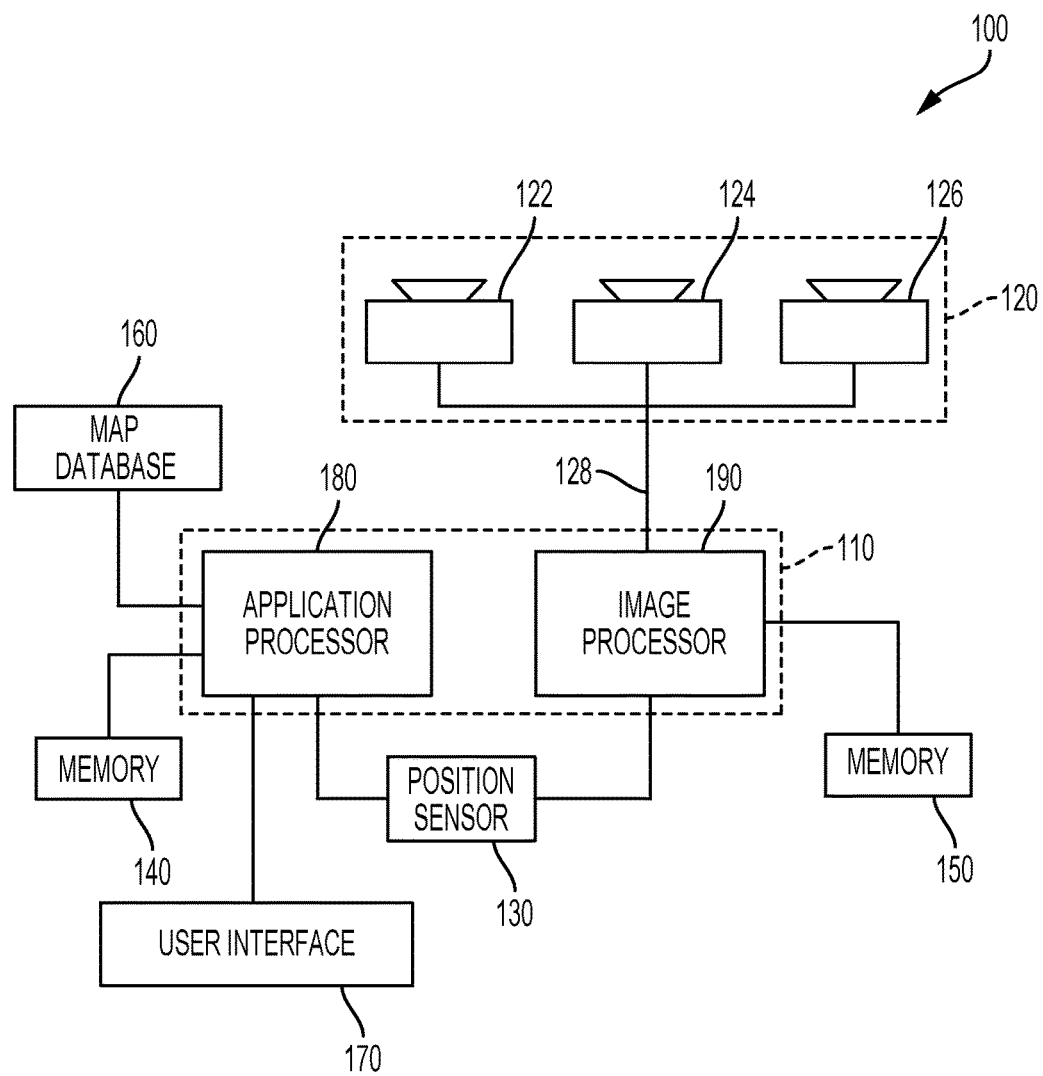
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments provide systems and methods that use cameras to provide autonomous navigation and/or driver assist technology features. Driver assist technology refers to any suitable technology to assist drivers in the navigation of their vehicles, such as LKA (lane keeping assist) and LDW (lane departure warning), as opposed to fully autonomous driving. In various embodiments, the system may include one, two or more cameras that monitor the environment of a vehicle. In one embodiment, the system may provide top-down refinement in lane marking navigation.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiments, processing unit 110 may include an application processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing unit 110 to image acquisition device 120. For example, data interface 128 may include any wired and/or wireless link or links for transmitting image data acquired by image accusation device 120 to processing unit 110.

Both application processor 180 and image processor 190 may include various types of processing devices. For example, either or both of application processor 180 and image processor 190 may include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, application processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

While FIG. 1 depicts two separate processing devices included in processing unit 110, more or fewer processing devices may be used. For example, in some embodiments, a single processing device may be used to accomplish the tasks of application processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., application processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the application processor 180 and/or image processor 190. In other embodiments, these memory units may be integrated into application processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to application processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, application processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
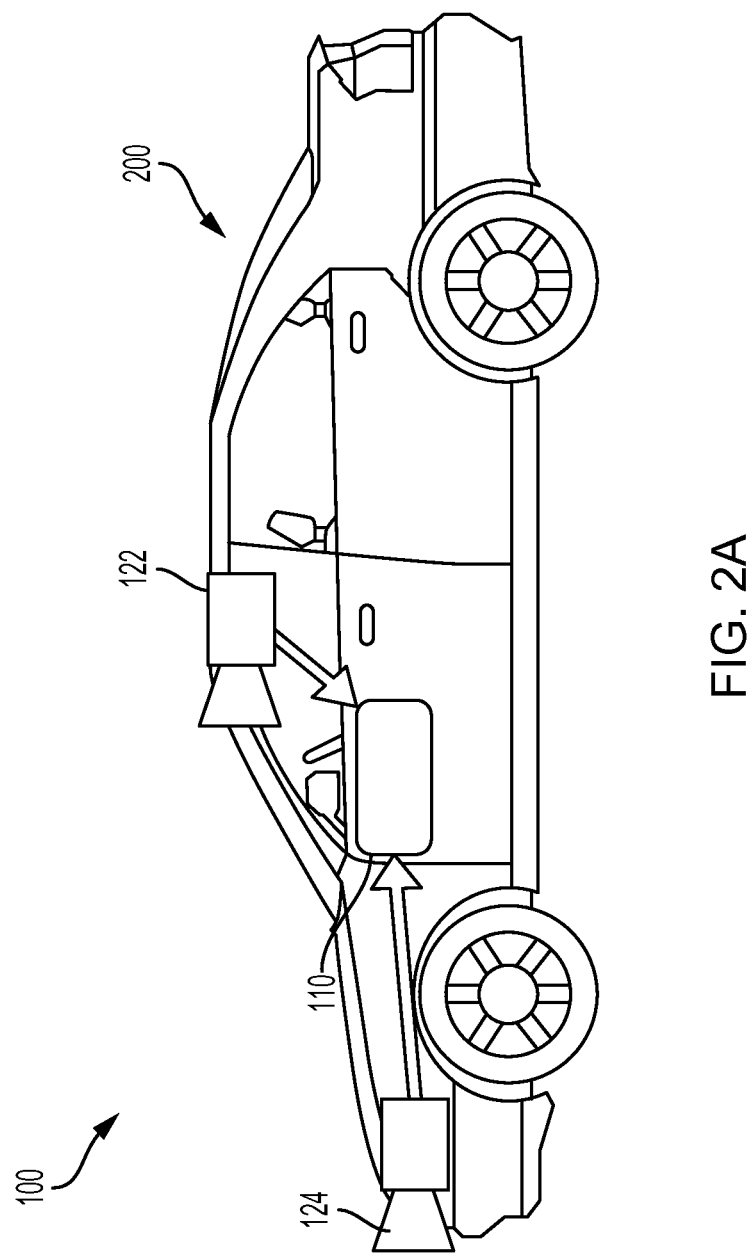
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
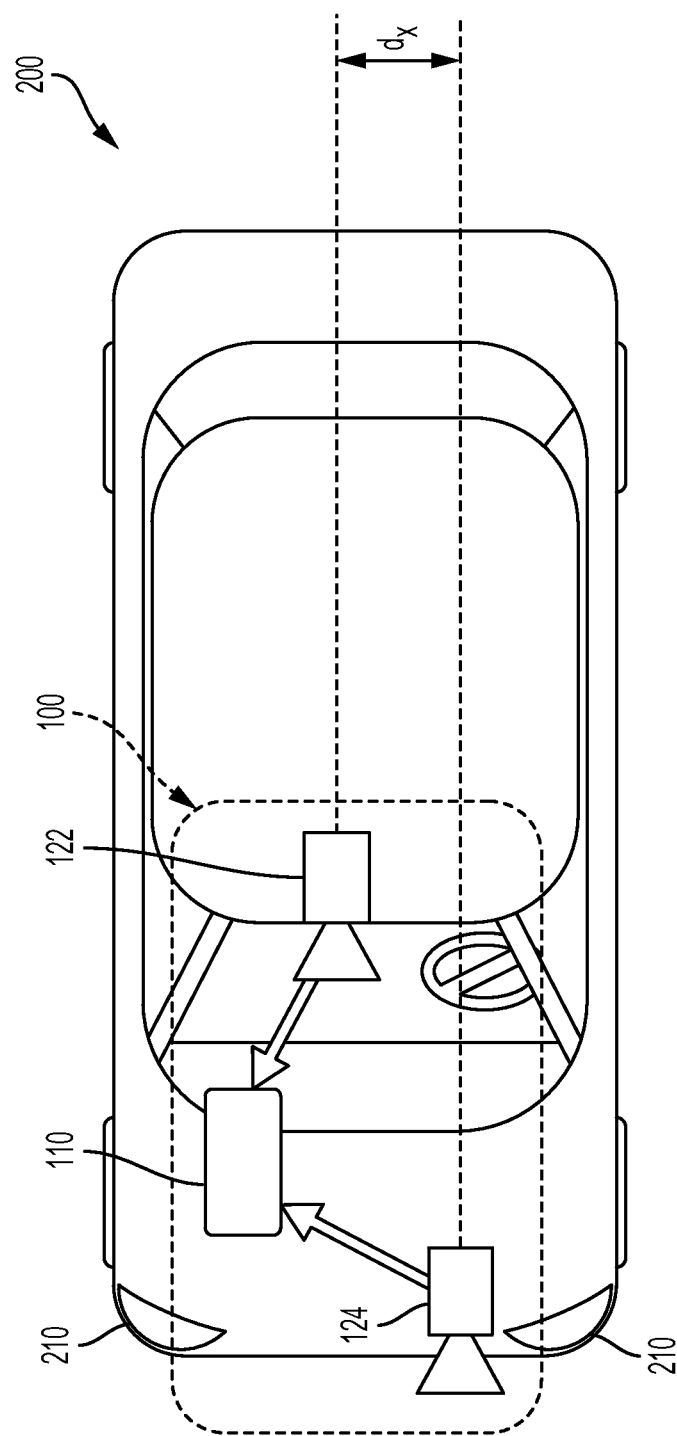
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
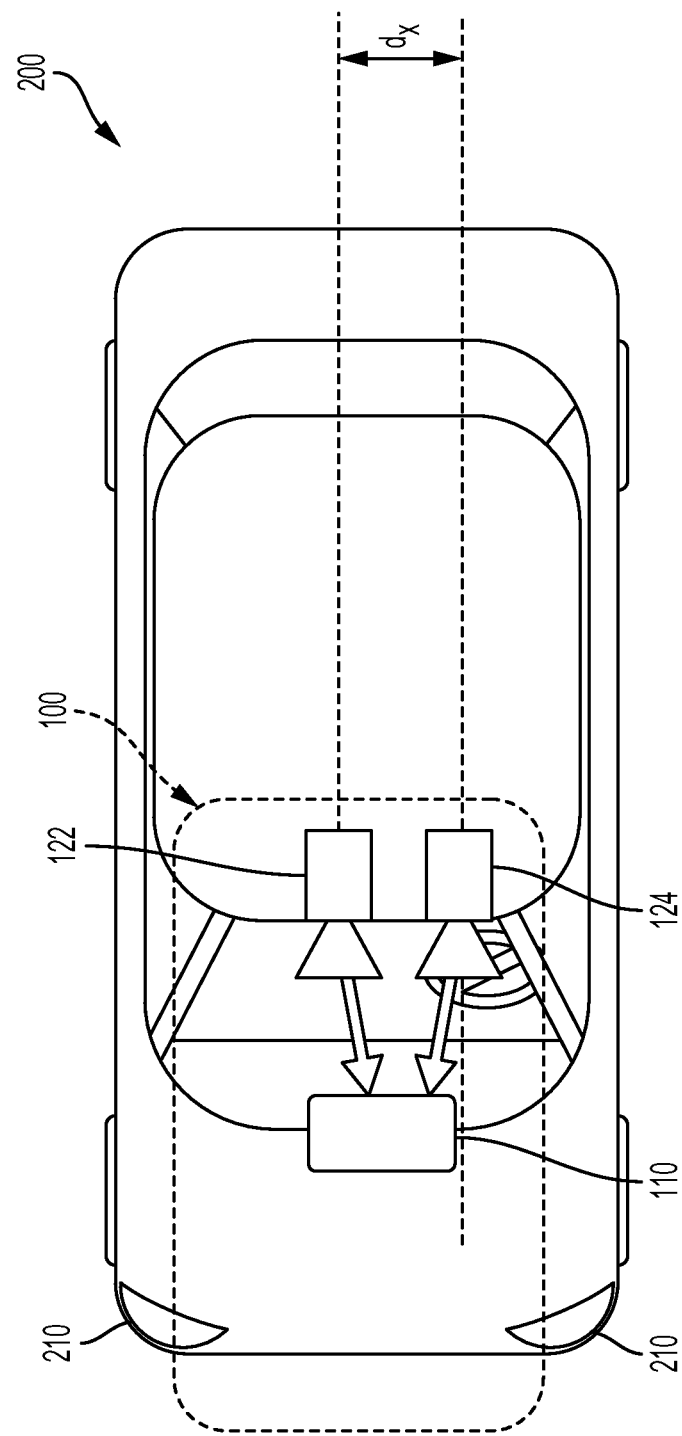
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2E:
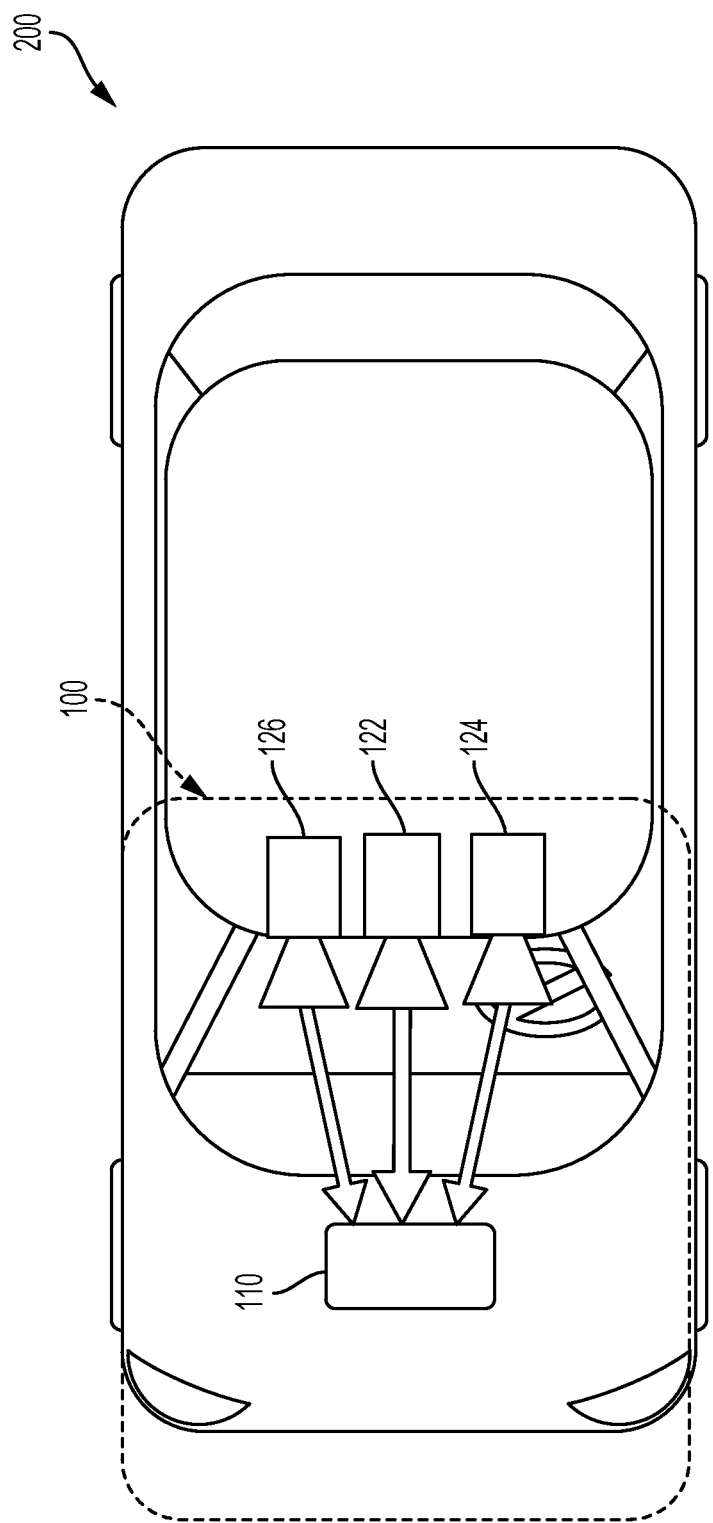
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts, including portable devices such as smartphones and wearable accessories such as helmets and self-contained mountable units. It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
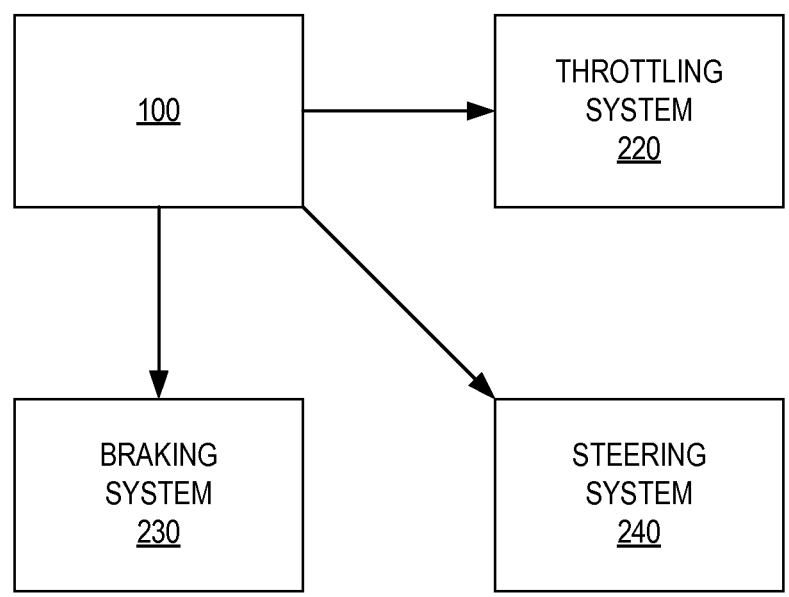
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
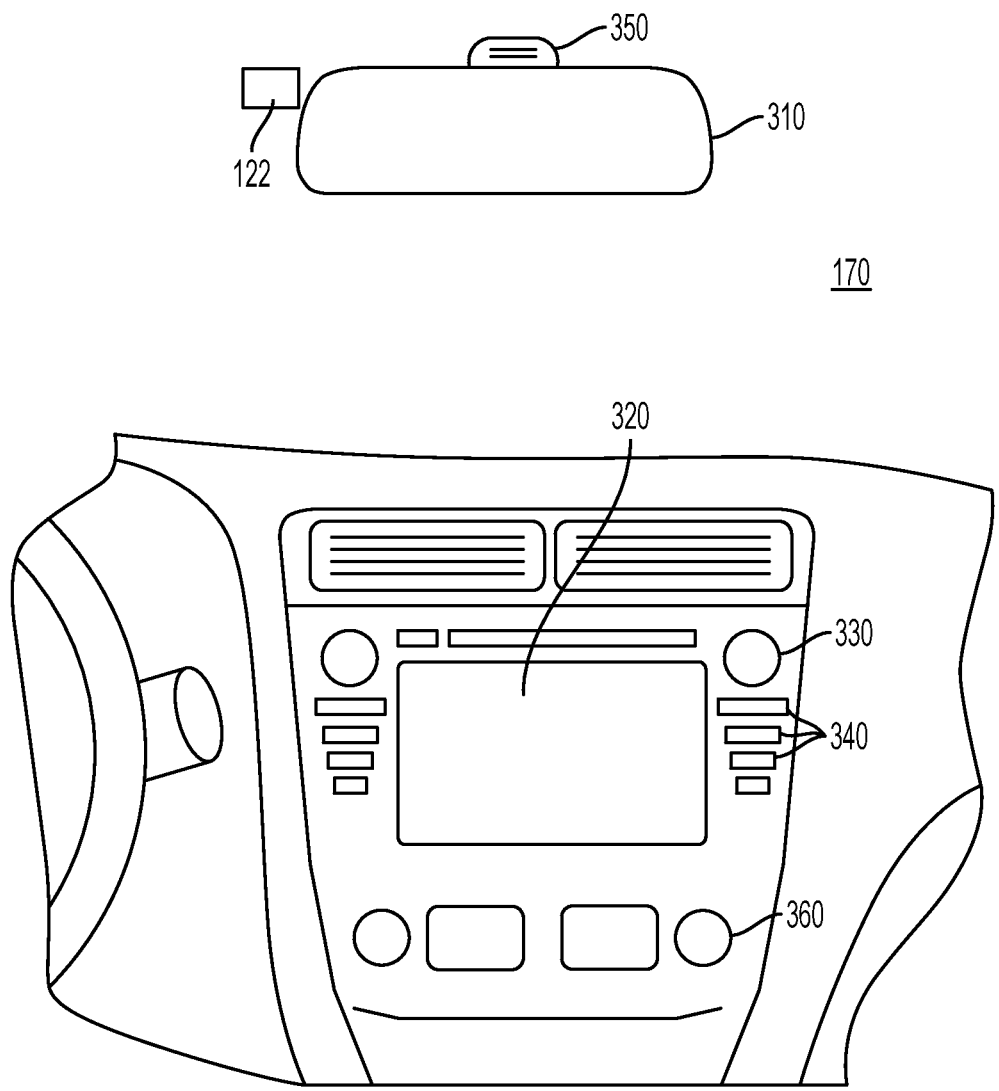
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
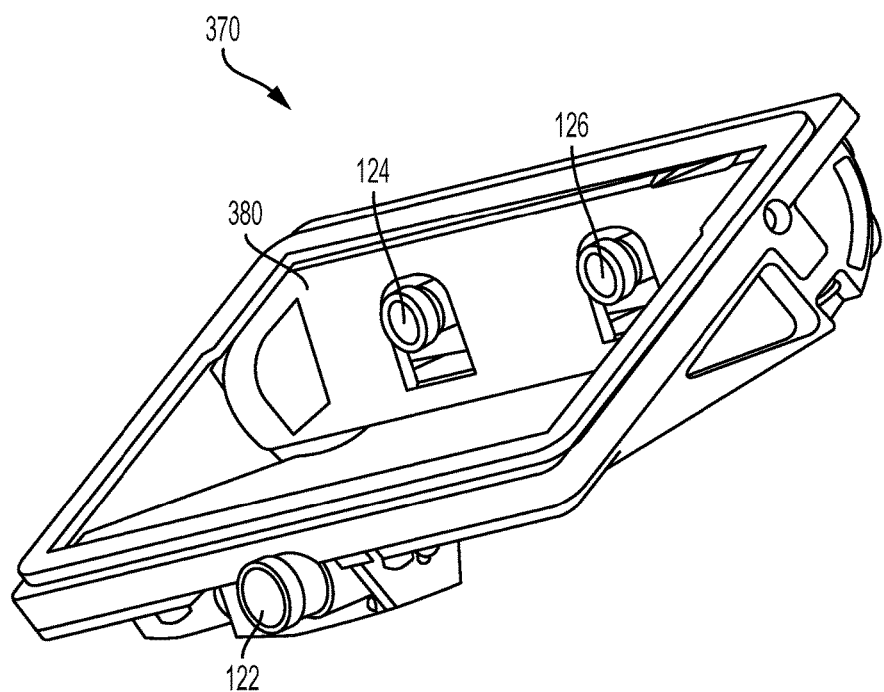
FIG. 3B is an illustration of an example of a camera mount that is configured to be positioned behind a rearview mirror and against a vehicle windshield consistent with the disclosed embodiments.
Figure 3C:
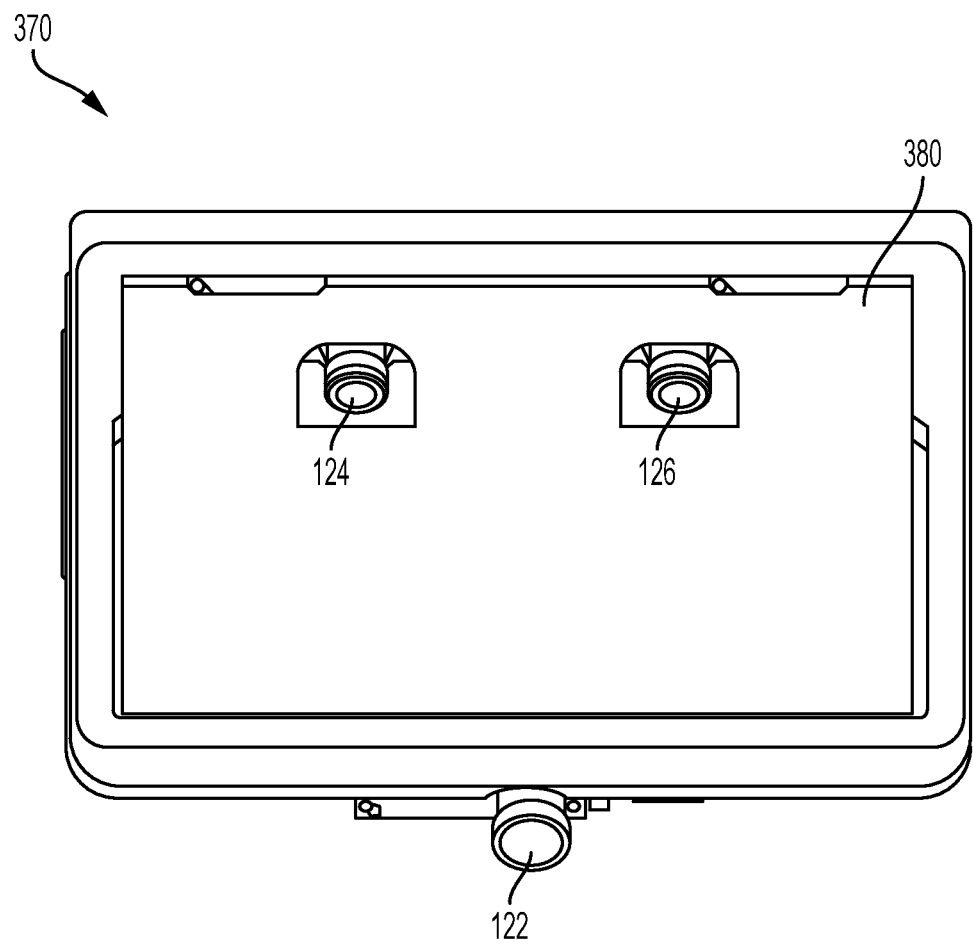
FIG. 3C is an illustration of the camera mount shown in FIG. 3B from a different perspective consistent with the disclosed embodiments.
Figure 3D:
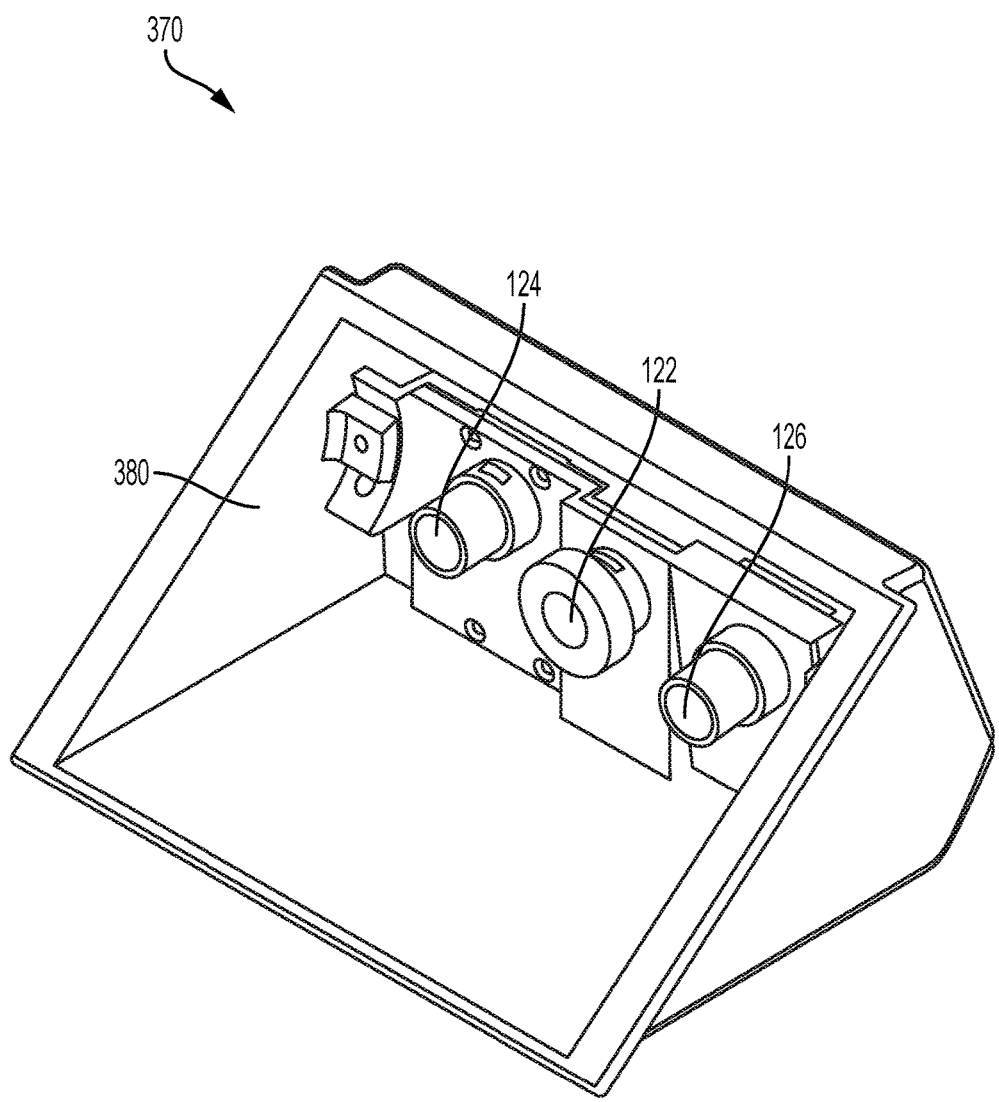
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data.

Further, consistent with disclosed embodiments, the functionality provided by system 100 may cause vehicle 200 to take different actions to navigate vehicle 200 within a lane and/or relative to other vehicles and/or objects. For example, system 100 may adjust the positioning of vehicle 200 relative to a lane within which vehicle 200 is traveling and/or relative to objects positioned near vehicle 200, select a particular lane for vehicle 200 to use while traveling, and take action in response to an encroaching vehicle, such as a vehicle attempting to move into the lane within which vehicle 200 is traveling. Additionally, system 100 may control the speed of vehicle 200 in different scenarios, such as when vehicle 200 is making a turn. System 100 may further cause vehicle 200 to mimic the actions of a leading vehicle or monitor a target vehicle and navigate vehicle 200 so that it passes the target vehicle. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
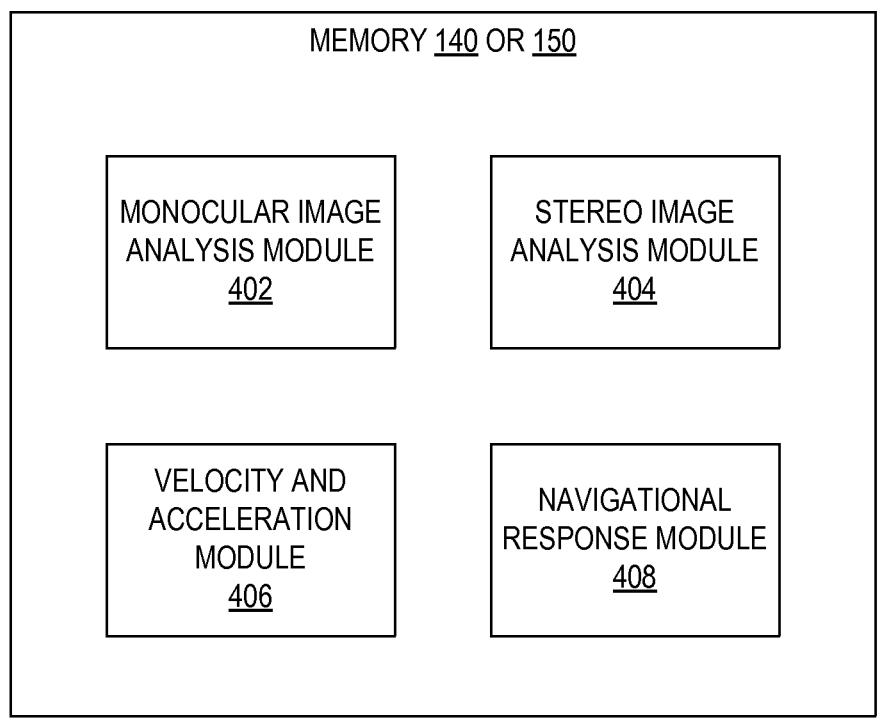
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
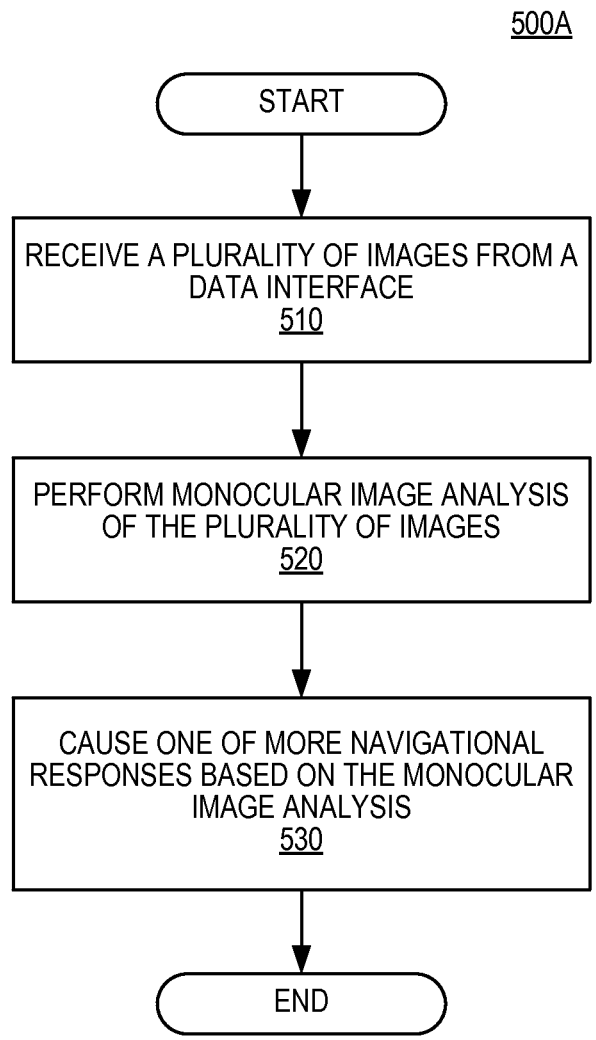
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
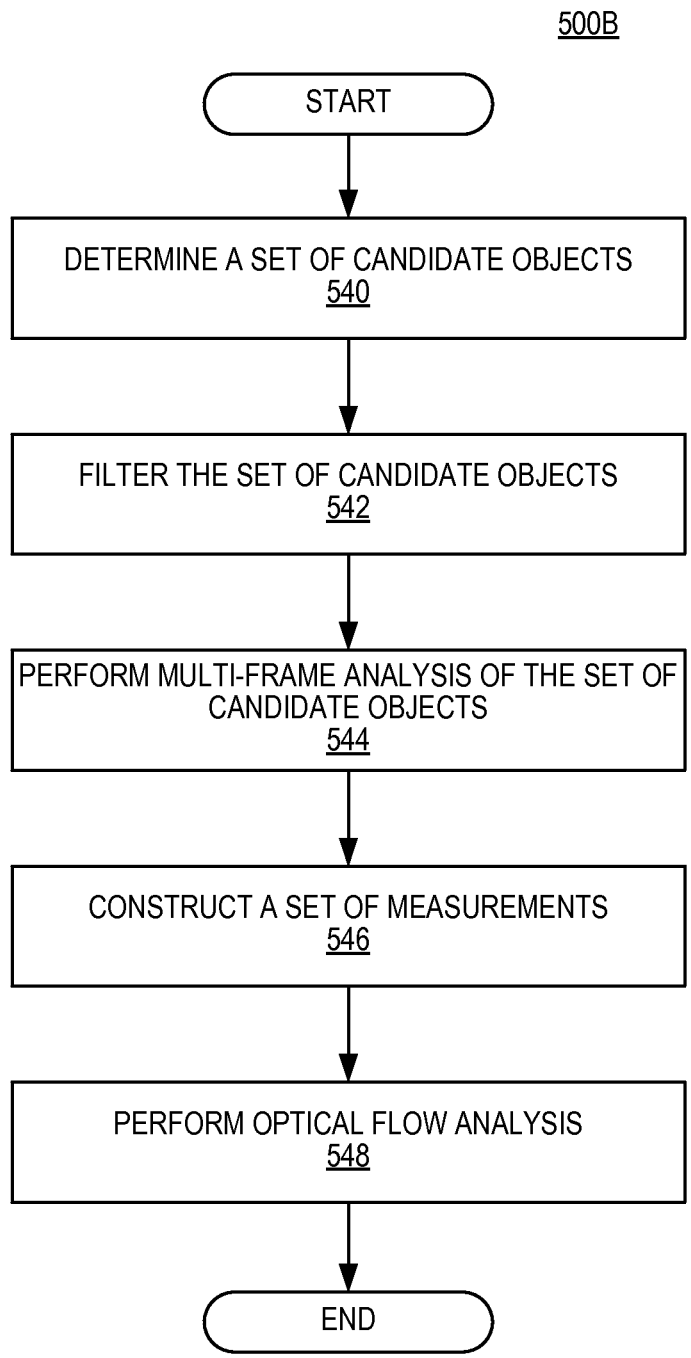
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
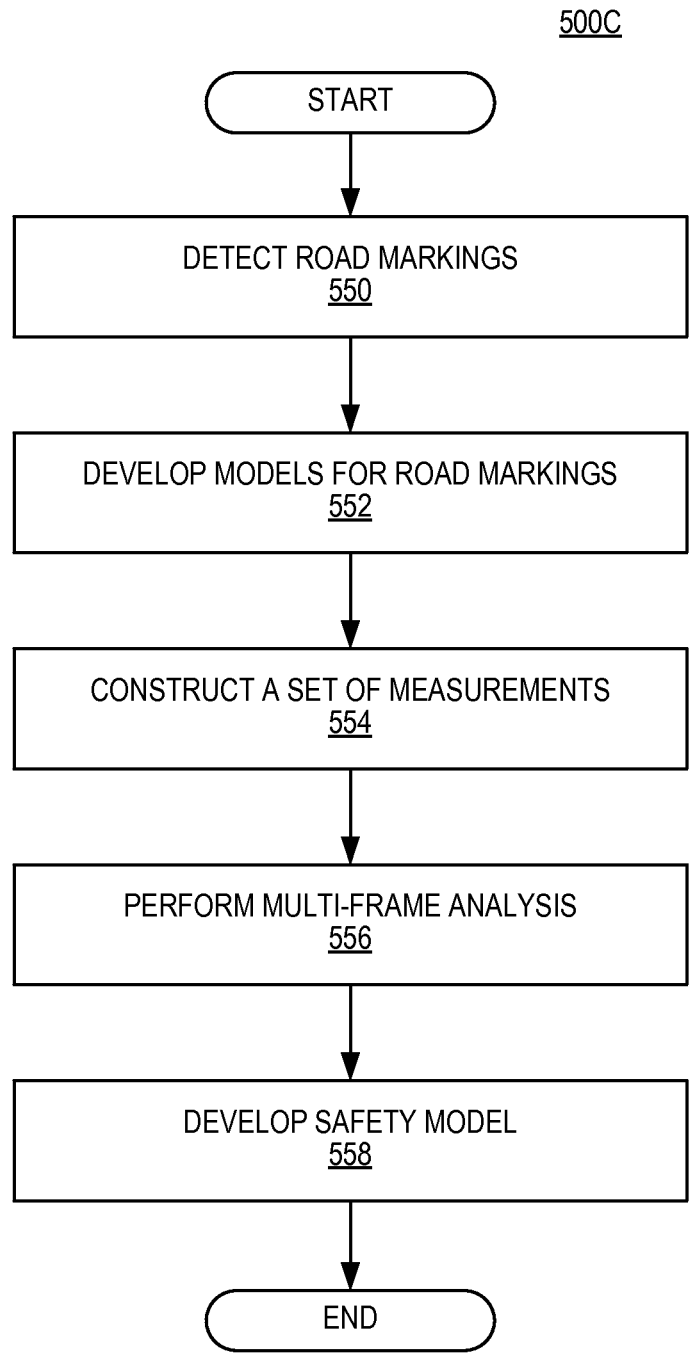
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
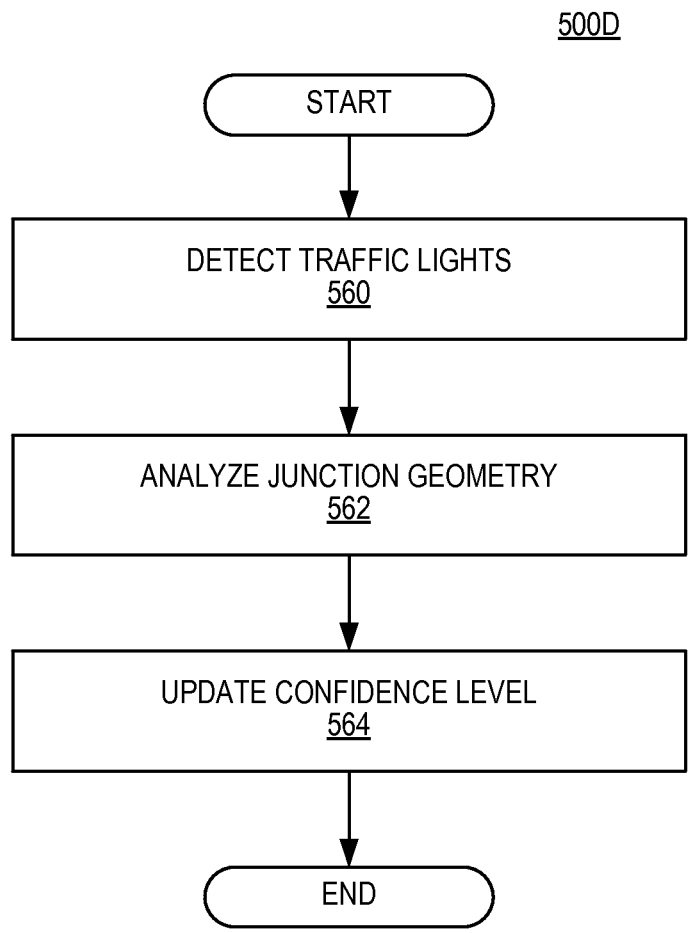
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
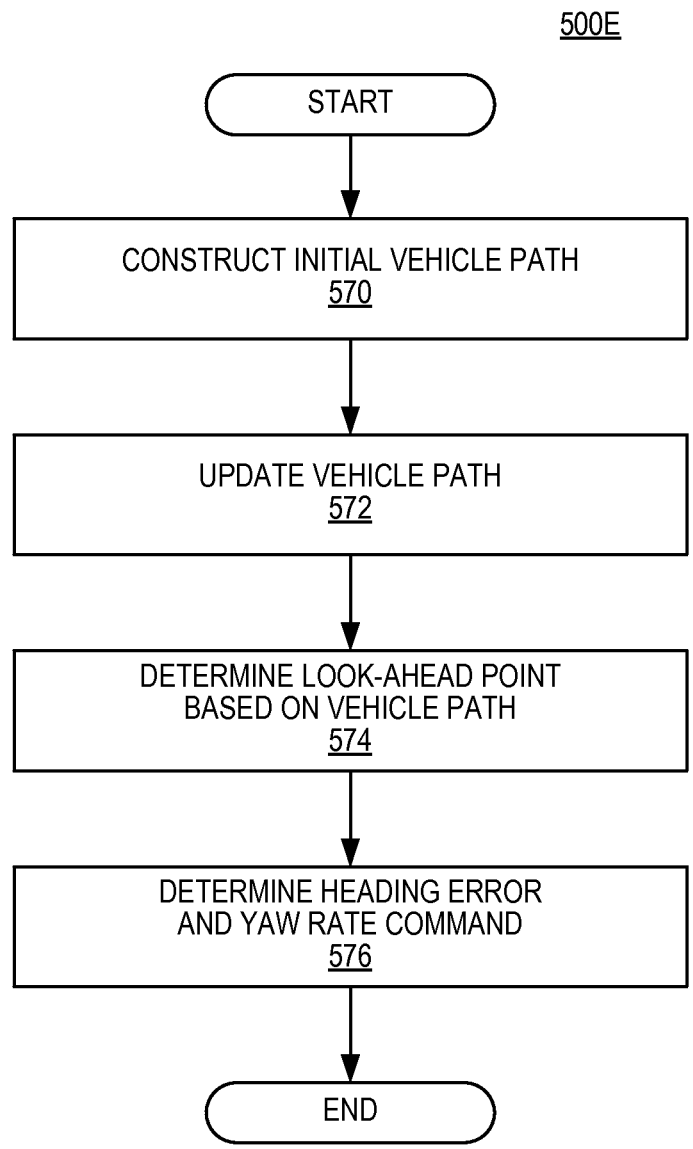
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path)

At step 574, processing unit 110 may determine a look-ahead point (expressed in coordinates as $(x_1, z_1)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_1/z_1)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
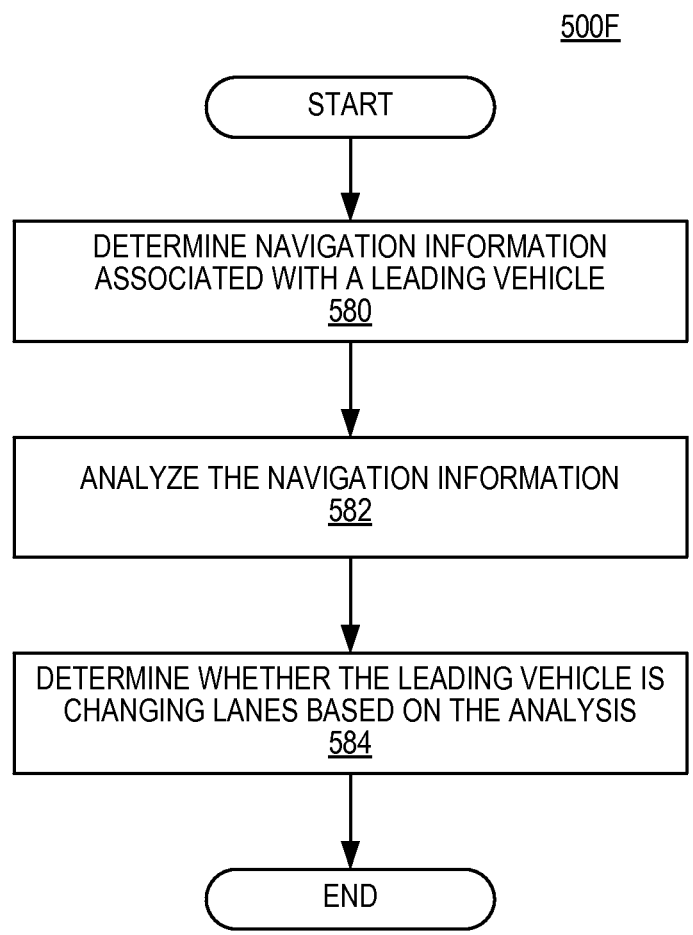
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
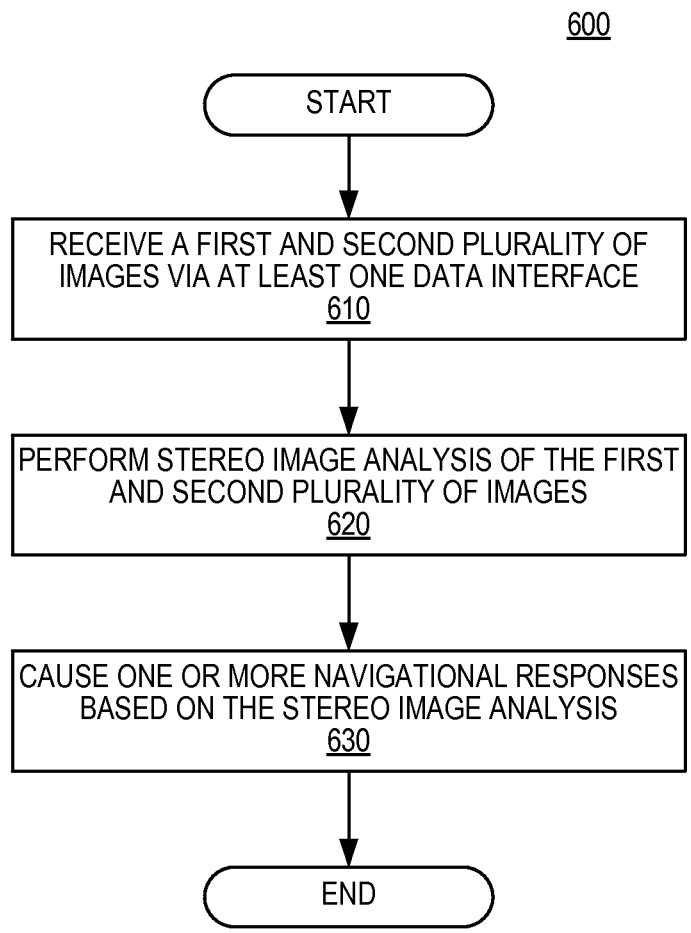
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
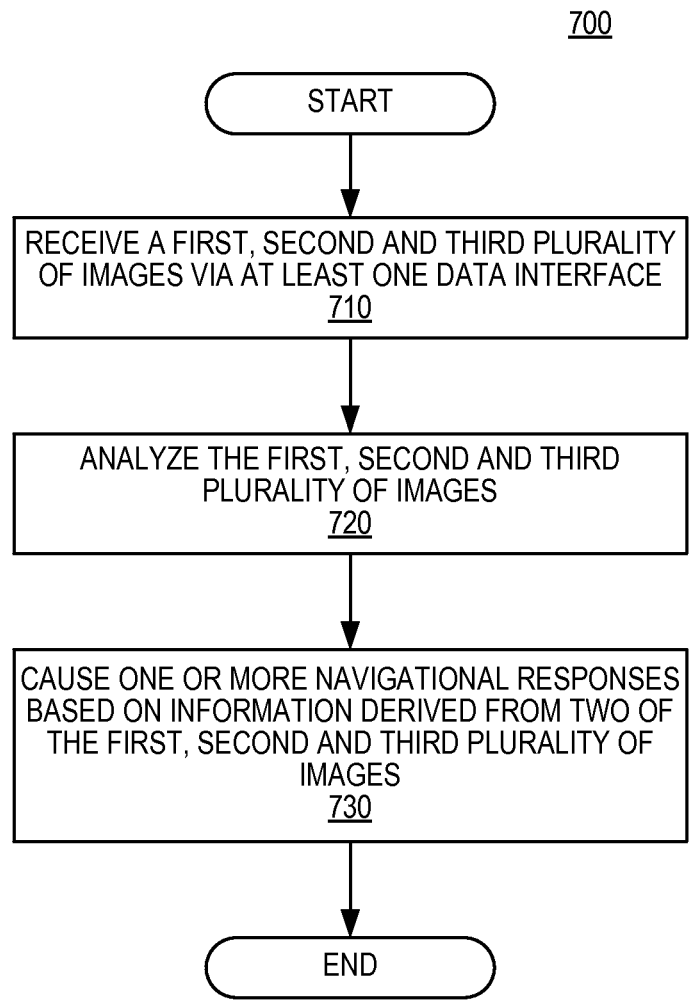
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Top-Down Refinement

System 100 may provide vehicle 200 with top-down refinement of a lane marking model to improve lane marking detection. Top-down refinement of an updated model, before it is matched with bottom-up detection, can lead to more accurate results than matching an updated model, without top-down refinement, with bottom-up detection.

In road processing an updated multi-frame analysis may be combined with bottom-up detection to build a model (e.g., parametric) of lane markings. The multi-frame analysis may update itself by relying on camera odometry to estimate, based on the model data, a predicted position of the lane markings at a subsequent time. The camera odometry, such as ego-motion or sensor data such as speed and yaw rate, may indicate how far the camera has moved relative to the roadway since a prior frame. The model of lane markings may comprise mathematical constructs, such as polynomials, to represent the lane markings on a roadway. Multi-frame analysis can be viewed as a model layer analysis that need not process raw image data (e.g., pixels), but rather prior model information. The multi-frame analysis may additionally or alternatively utilize any suitable A bottom-up detection system may comprise a single frame analysis that generates a model of lane markings based on image data. The model generated from the single frame analysis can then be matched to the lane marking model to redetect, eliminate of make new lane markings in the lane marking model. Single frame analysis can be viewed as an image layer analysis that processes raw image data. For example, it may include identifying edgelets (e.g., using the Sobel method and non-maximal suppression), creating segments (e.g., using local Hough-peaks and iteratively reweighted least squares method), growing a graph (e.g., using a statistically tuned semi-greedy scan line algorithm—approximating best subset choosing).

It should be understood that for the purposes of the present disclosure each frame analyzed in either the multi-frame or single frame analysis need not be limited to image data from only one camera at a particular time but can also comprise image data derived from multiple cameras at a particular time.

Figure 8A:
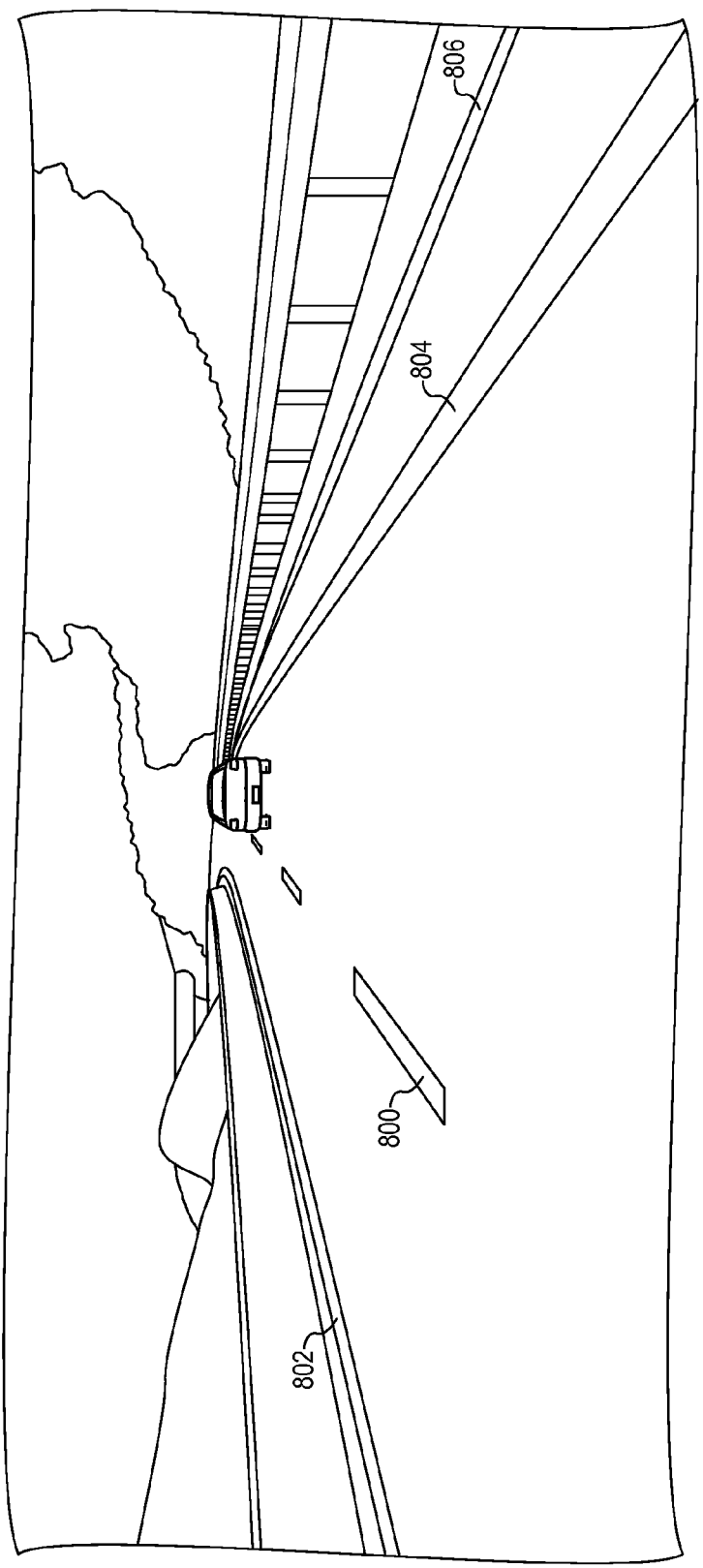
FIGS. 8A-8D are diagrammatic representations of exemplary lane detection analyses without top-down refinement.
Figure 8B:
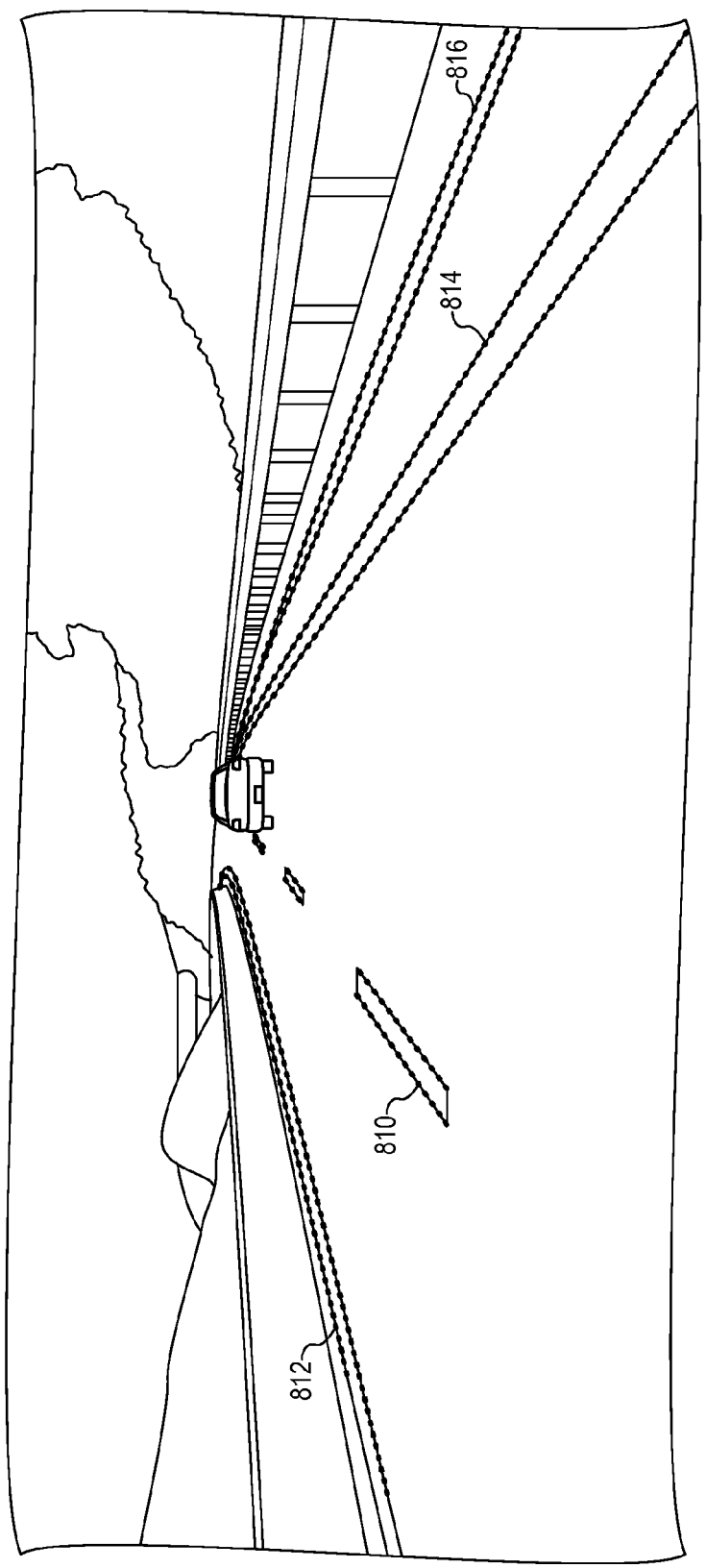

FIGS. 8A-8D are diagrammatic representations of exemplary lane detection analyses without top-down refinement, such as those that may be implemented by a bottom-up detection system. FIGS. 8A and 8B illustrates how well lane markings can be detected by a bottom-up detection system when an image of a roadway in a vicinity of a vehicle is in good condition (e.g., clear weather conditions, clear windshield in front of camera(s), new road with no tar marks/seams, bright and clear lane markings). FIG. 8A illustrates an image of a roadway in good condition, with lane markings comprising solid lines 802, 804 and 806 and dashed line 800. FIG. 8B shows sections 812, 814 and 816 as identified by the bottom-up detection system, accurately representing solid line 802, 804 and 806, and section 810 as identified by the system, accurately representing dashed line 800. The accurate identification of sections 810, 812, 814 and 816 result in solid lines 802, 804 and 806 and dashed line 800 being correctly detected by the system.

Figure 8C:
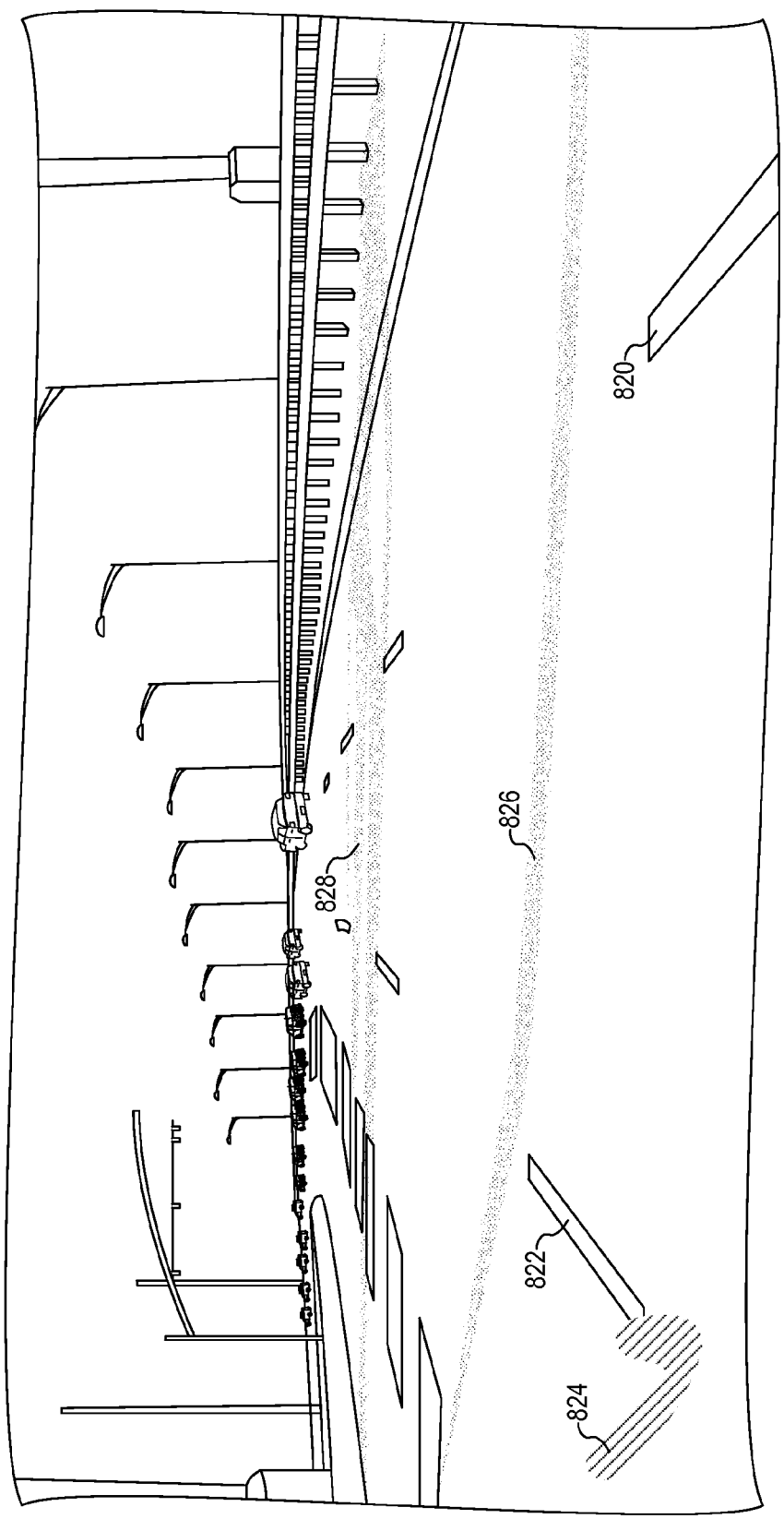
Figure 8D:
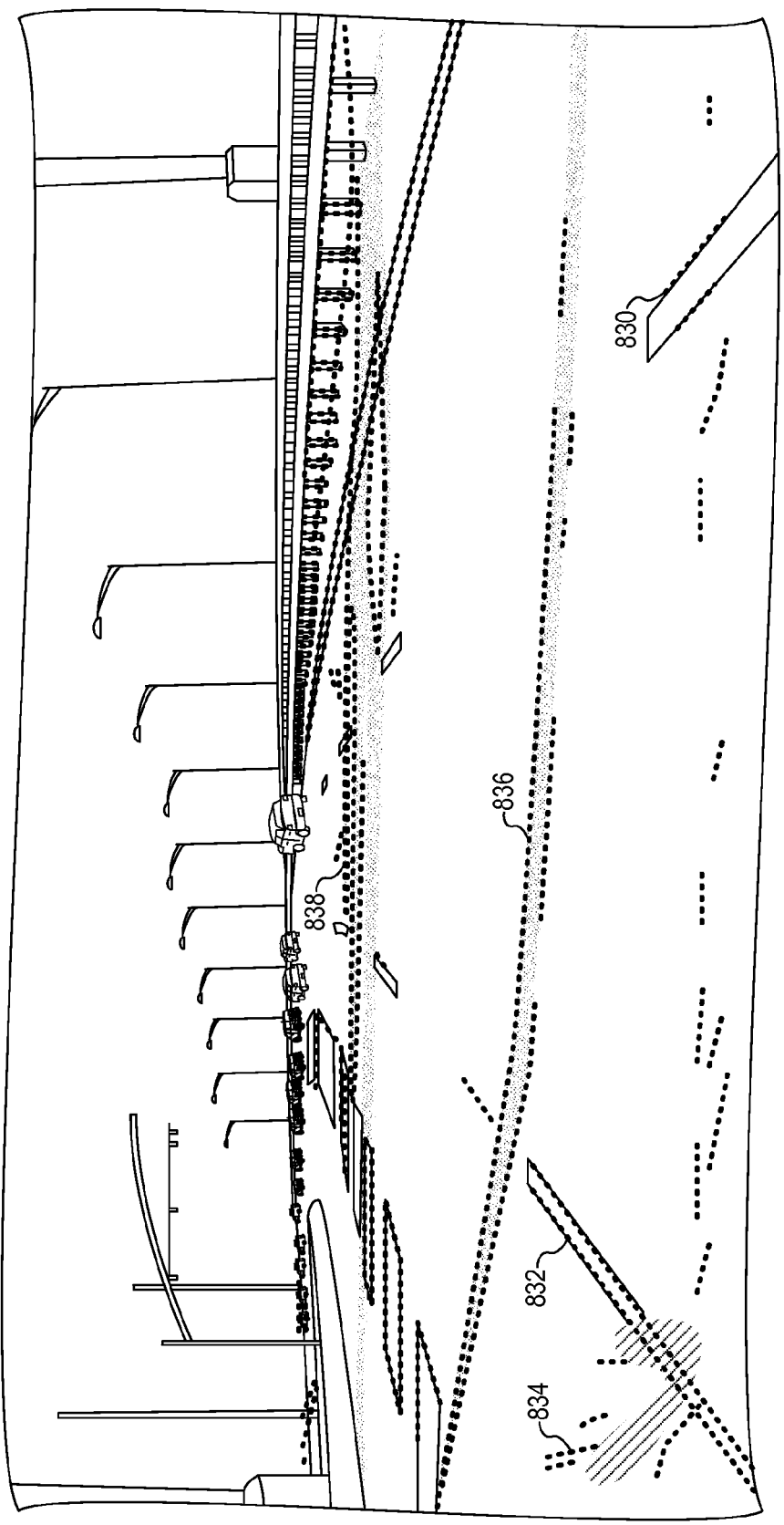

However, lane detection can become more difficult when an image of a roadway in a vicinity of a vehicle comprises a tough scene, such as those having low SNR (signal to noise ration), low sun, shadows, washed-out markings, curves—especially with dashed lines, and only a single or partial dash of a dashed line in view. FIG. 8C illustrates an image of a roadway in a tough scene, with lane markings comprising curved dashed lines 820 and 822, light pole shadows 826 and 828, and sun glare region 824 on the vehicle windshield in front of the camera(s). FIG. 8D shows sections 830 and 832 as identified by the bottom-up detection system, accurately representing dashed lines 820 and 822, but sections 834, 836 and 838 are also identified by the system, which represent sun glare region 824 and light pole shadows 826 and 828. The accurate identification of sections 830 and 832, but the inaccurate identification of sections 834, 836 and 838, result in dashed lines 820 and 822 being only partially correctly detected by the system. For example, the system may inaccurately detect dashed lines 820 and 822 as being longer than they actually are.

This example can reflect problems with bottom-up detection, such as solving a big combinatorial search, needing to be cheap and greedy (e.g., by setting limits on edgelets, segments, and graph growing), causing missing and unclean paths, making it difficult to classify objects (especially dashes), and sometimes costing too much. Bottom-up detection is designed to do bottom up processing that assumes very little about the scene (e.g., mostly just calibration and horizon), and tries to build a graph of paths representing the road structures for each frame (e.g., painted lanes, road edge, barriers) independently. These structures are then linked up (e.g., using a more constrained $3^{rd}$ degree polynomial model) over time to form the multi-frame candidates which may then be approved and become part of the lane marking model.

This type of bottom-up detection system does a lot of work (since it assumes very little) and has to take shortcuts, mostly in the form of making early greedy decisions. However, once the system has a set of good candidates (from the previous frame, for example), the system can do better by going back into the image and verifying, extending, and refining those candidates. This is a goal of refinement.

Figure 9:
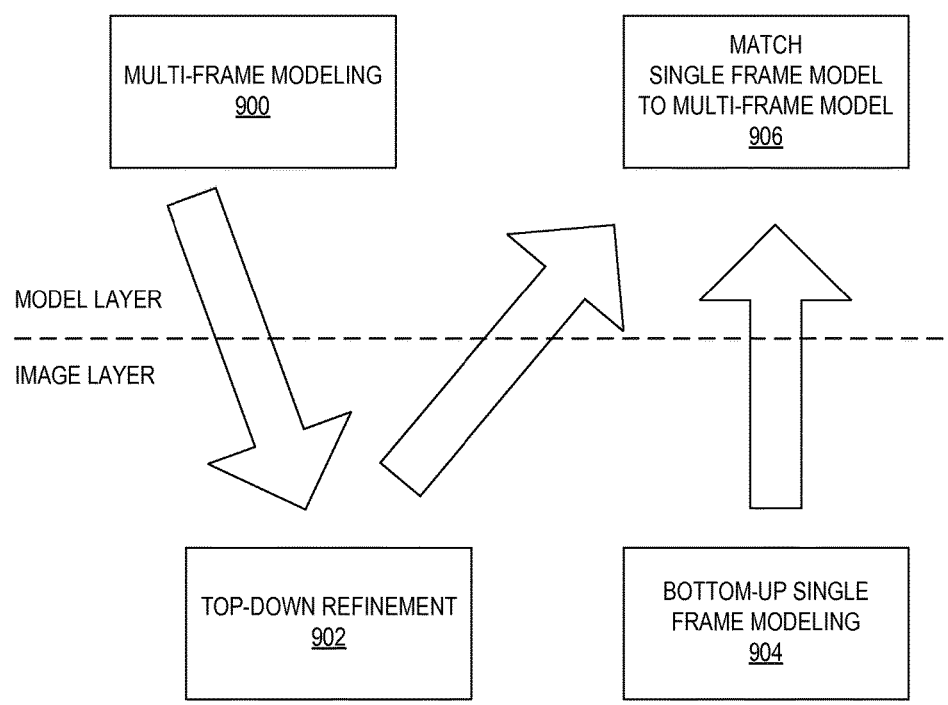
FIG. 9 is a diagrammatic representation of an exemplary top-down refinement architecture consistent with the disclosed embodiments.

FIG. 9 is a diagrammatic representation of an exemplary top-down refinement architecture consistent with the disclosed embodiments. As shown in FIG. 9, multi-frame modeling 900 may undergo a top-down refinement (902) of its update of the lane marking model in the image layer, prior to matching (906) in the model layer against the single frame modeling generated from bottom-up detection (904). By introducing refinement to the updated lane marking model, system 100 can search the image at a location that the multi-frame analysis expects lane marks to be, and it can search the image for a lane mark appearance known by system 100. The appearance model can comprise any suitable feature or combination of features, such as dimensions (e.g., width, cross-section, distance along its length, profile, shape), texture, sharpness of edges, brightness, etc. In other words, top-down refinement allows system 100 to use the history of what a lane marking looked like in the past in order to help identify the candidate lane marks in the current image. In the context of dashed lines, system 100 may use an appearance model in combination any other suitable feature, such as one or more of a spacing between the dashes, a lateral position of the dashes relative to the roadway, and the existence of a parallel lane mark on one side of a dash, which together forms a double lane mark (e.g., like a double yellow line in the U.S.). Top-down refinement can provide robustness by being semi-independent and provide cleaner detections, extended view range, more accurate and richer modeling and load balancing.

Based on the top-down refinement of the lane marking model, system 100 may determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze collected data based on the top-down refinement of the lane marking model and issue warnings and/or alerts to vehicle occupants based on the analysis of the collected data.

Any lane mark candidate proposal system which specifies an approximate position (either parametrically or non-parametrically) for a given frame may constitute the input hypothesis that is being refined. Such a proposal may comprise additional information besides the approximate position of the lane mark that can then be used by the refinement algorithm (such as width, brightness, dash mark spacing, edge sharpness, etc.) but these are not necessary to run the refinement algorithm. Thus, such hypotheses can come from:

- if no lane marks were found, then assumed lane mark location and orientation relative to vehicle 200 (e.g., parallel to the vehicle on either side)
- if a lane mark was detected by some method somewhere in the image, the location of other lane marks that are parallel and are at some lane-width distance away can be hypothesized
- any other suitable lane detection systems, and/or
- any such algorithms (including refinement) that found lane marks on the previous frame and, using ego-motion, estimated their position on the current frame.

Figure 10A:
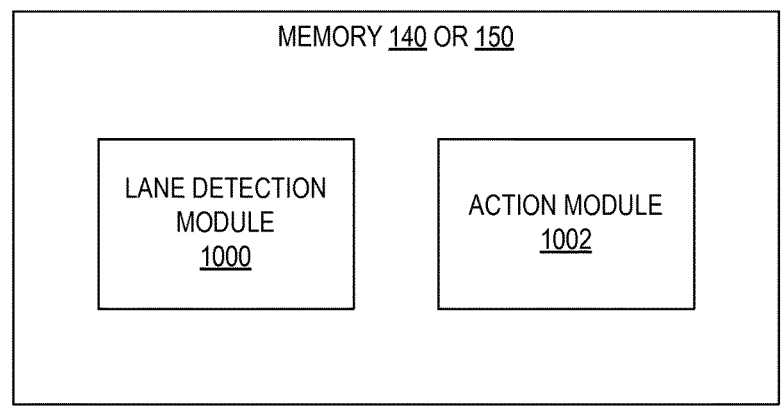
FIG. 10A is a diagrammatic representation of the memory of an exemplary navigation system consistent with the disclosed embodiments.

FIG. 10A is an exemplary block diagram of memory 140 or 150, which may store instructions for performing one or more operations consistent with disclosed embodiments. As illustrated in FIG. 10A, memory 140 or 150 may store one or more modules for performing the top-down refinement of a lane marking model described herein. For example, memory 140 or 150 may store a lane detection module 1000 and an action module 1002.

Lane detection module 1000 may store instructions which, when executed by processing unit 110, may perform top-down refinement of a lane marking model. For example, processing unit 110 may receive from one or more cameras 122, 124 and 126 one or more images of a roadway in a vicinity of a vehicle. The roadway may comprise a lane marking comprising a dashed line. Processing unit 110 may update a model of the lane marking based on odometry of the one or more cameras relative to the roadway, and refine the updated model of the lane marking based on an appearance of dashes derived from the received one or more images and a spacing between dashes derived from the received one or more images.

The camera odometry may comprise any suitable mechanism to determine the distance traveled by the camera relative to the roadway, such as ego-motion, sensor data such as speed and yaw rate, and/or visual analysis of multiple successive image frames.

The refinement of the updated model may be further based on a lateral position, relative to the roadway, of dashes derived from the received one or more images. The refinement of the updated model may be further based on existence of a parallel lane marking on one side of dashes derived from the received one or more images. The appearance of the dashes can comprise any suitable identifying feature, such as one or more of a width of the dashes, a brightness of the dashes and an edge sharpness of the dashes. The refinement of the updated model may comprise a dynamic programming technique.

Processing unit 110 may also generate a model of the lane marking based on the received one or more images, and match the generated model to the refined model to approve the lane marking.

Action module 1002 may store instructions which, when executed by processing unit 110, may cause one or more navigational responses in the vehicle based on the refinement of the updated model. The one or more one navigational responses may comprise a steering of the vehicle and/or an audible alert.

Figure 10B:
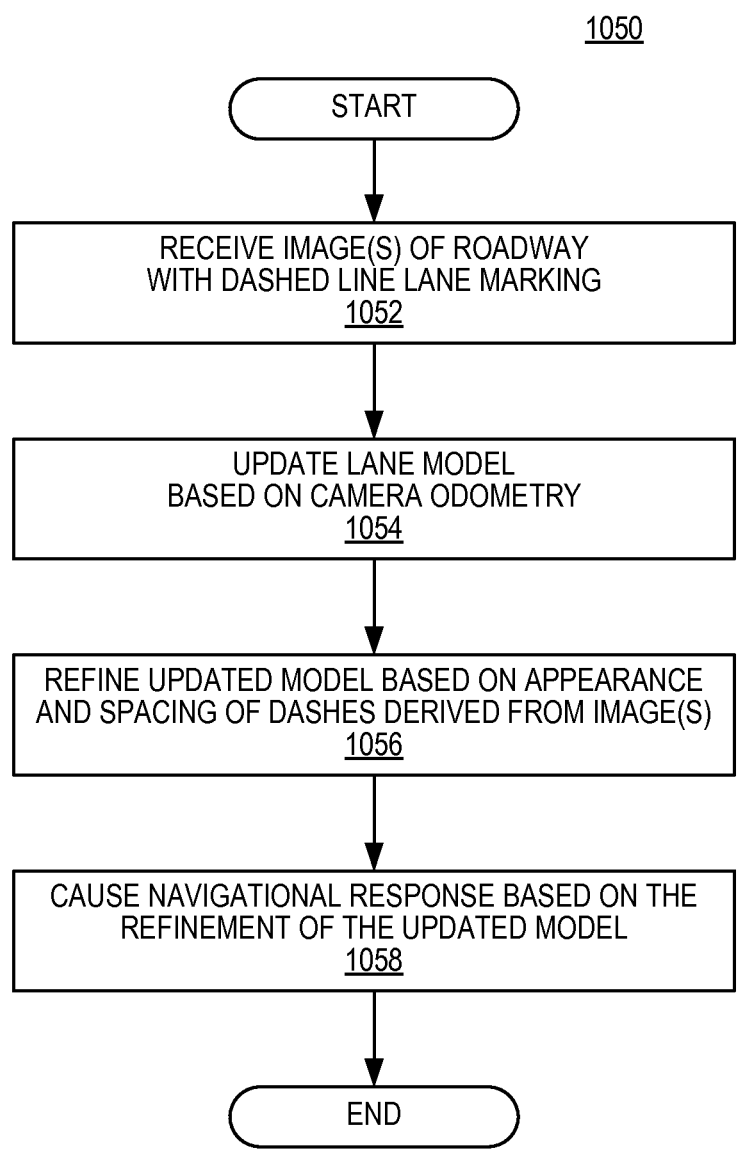
FIG. 10B is a flowchart of an exemplary process for navigating a vehicle using top-down refinement consistent with the disclosed embodiments.

FIG. 10B illustrates a process 1050 for performing the top-down refinement of a lane marking model consistent with disclosed embodiments. According to some embodiments, process 1050 may be implemented by one or more components of navigation system 100, such as at least one processing unit 110. At step 1052, process 1050 may receive, by one or more processors, from one or more cameras one or more images of a roadway in a vicinity of a vehicle. The roadway may comprise a lane marking comprising a dashed line. At step 1054, process 1050 may update, by one or more processors, a model of the lane marking based on odometry of the one or more cameras relative to the roadway. At step 1056, process 1050 may refine, by one or more processors, the updated model of the lane marking based on an appearance of dashes derived from the received one or more images and a spacing between dashes derived from the received one or more images. At step 1058, process 1050 may cause, by one or more processors, one or more navigational responses in the vehicle based on the refinement of the updated model.

In process 1050 the camera odometry may comprise any suitable mechanism to determine the distance traveled by the camera relative to the roadway, such as ego-motion, sensor data such as speed and yaw rate, and/or visual analysis of multiple successive image frames. The refinement of the updated model may be further based on a lateral position, relative to the roadway, of dashes derived from the received one or more images. The refinement of the updated model may be further based on existence of a parallel lane marking on one side of dashes derived from the received one or more images. The appearance of the dashes can comprise any suitable identifying feature, such as one or more of a width of the dashes, a brightness of the dashes and an edge sharpness of the dashes. The refinement of the updated model may comprise a dynamic programming technique. A model of the lane marking may also be generated based on the received one or more images, and the generated model may be matched to the refined model to approve the lane marking.

Figure 11A:
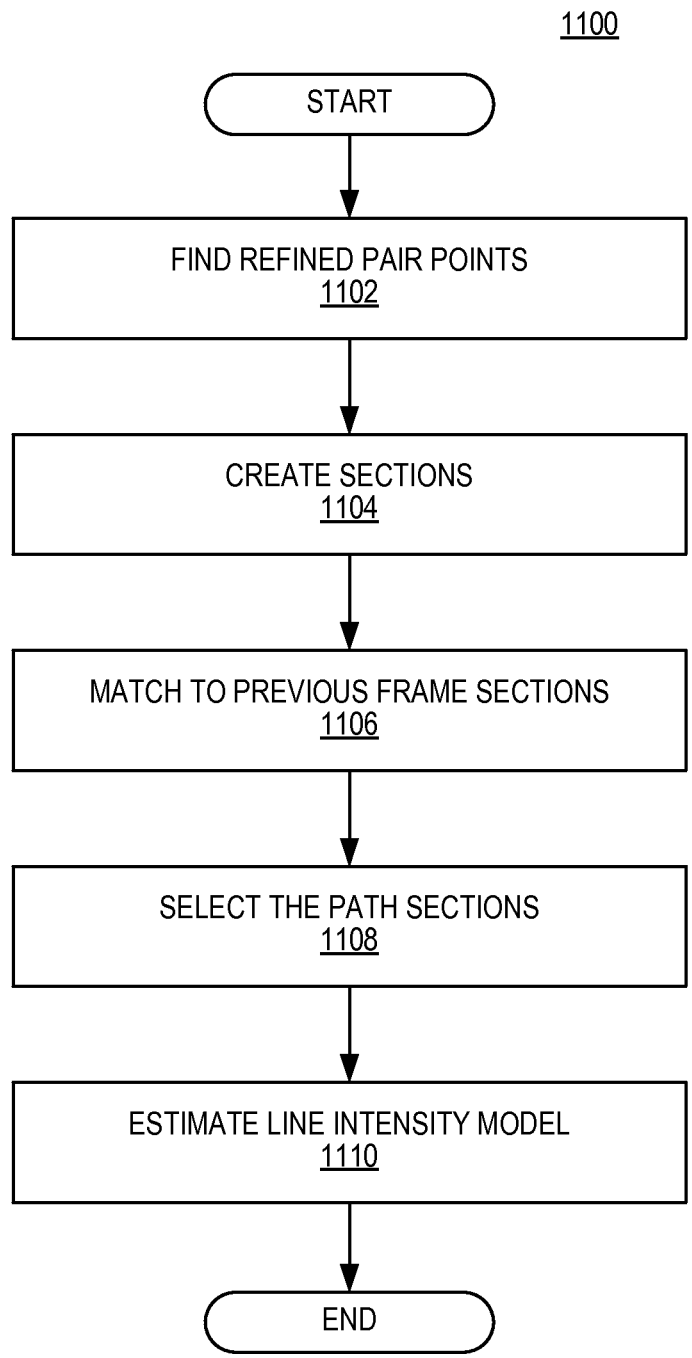
FIG. 11A is a flowchart of an exemplary process for implementing top-down refinement consistent with the disclosed embodiments.

FIG. 11A illustrates a process 1100 for implementing top-down refinement consistent with the disclosed embodiments. FIGS. 11B-11N are diagrammatic representations of the top-down refinement implementation consistent with the disclosed embodiments.

Figure 11B:
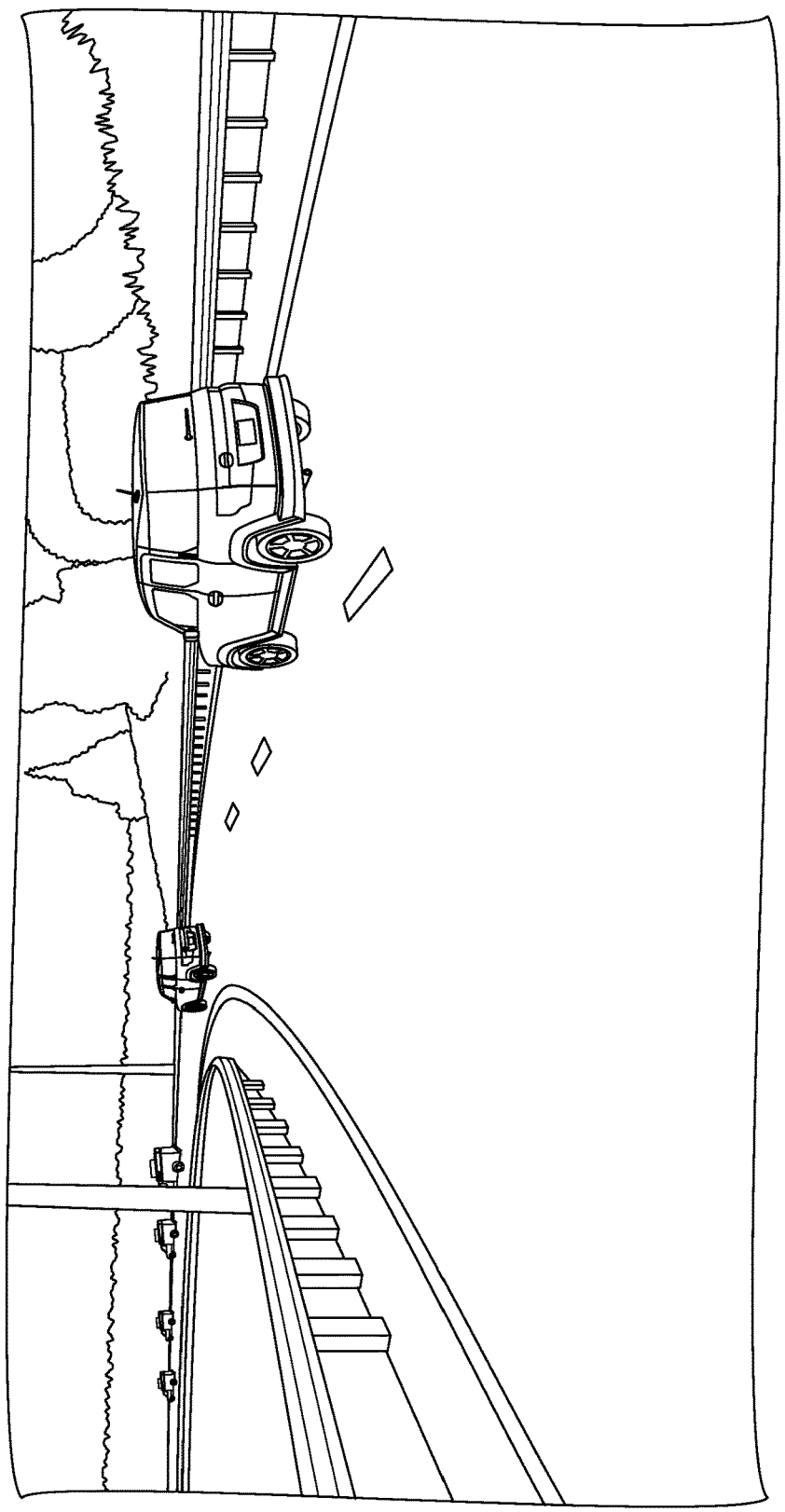
FIGS. 11B-11N are diagrammatic representations of a top-down refinement implementation consistent with the disclosed embodiments.
Figure 11C:
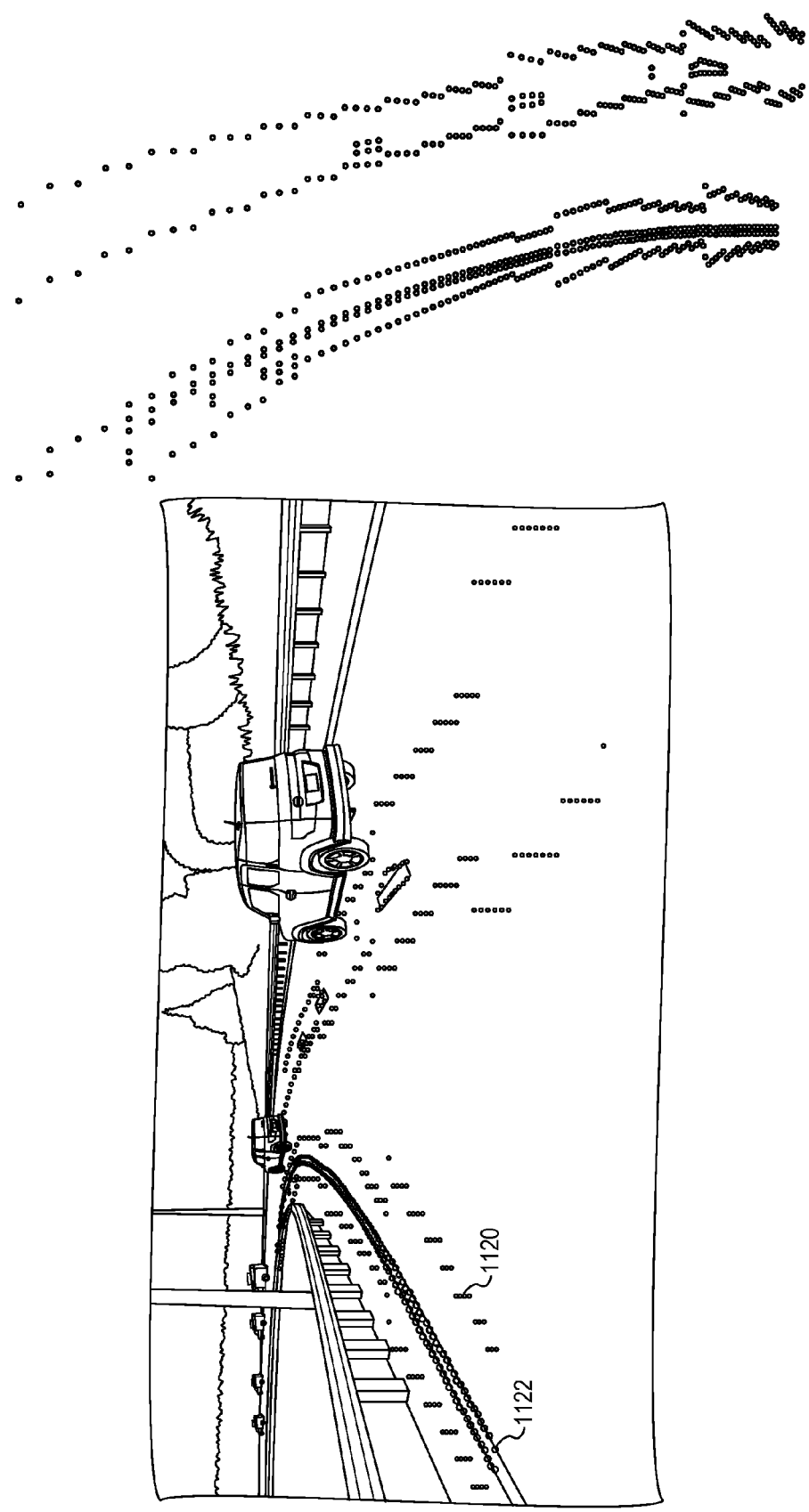

According to some embodiments, process 1100 may be implemented by one or more components of navigation system 100, such as at least one processing unit 110. At step 1102, process 1100 may find refined pair points (RPPs). For example, system 100 may analyze received image data as shown in FIG. 11B and identify RPPs along the edges of the left and right lane markings, such as RPPs 1122, as shown in FIG. 11C. The vertical dots, such as boundary 1120, mark the search area around the predicted position of the lane marking where system 100 looks for RPPs based on the multi-frame analysis. The roadway in the image data may be straightened to provide a bird's eye view that does not converge at the horizon.

Figure 11D:
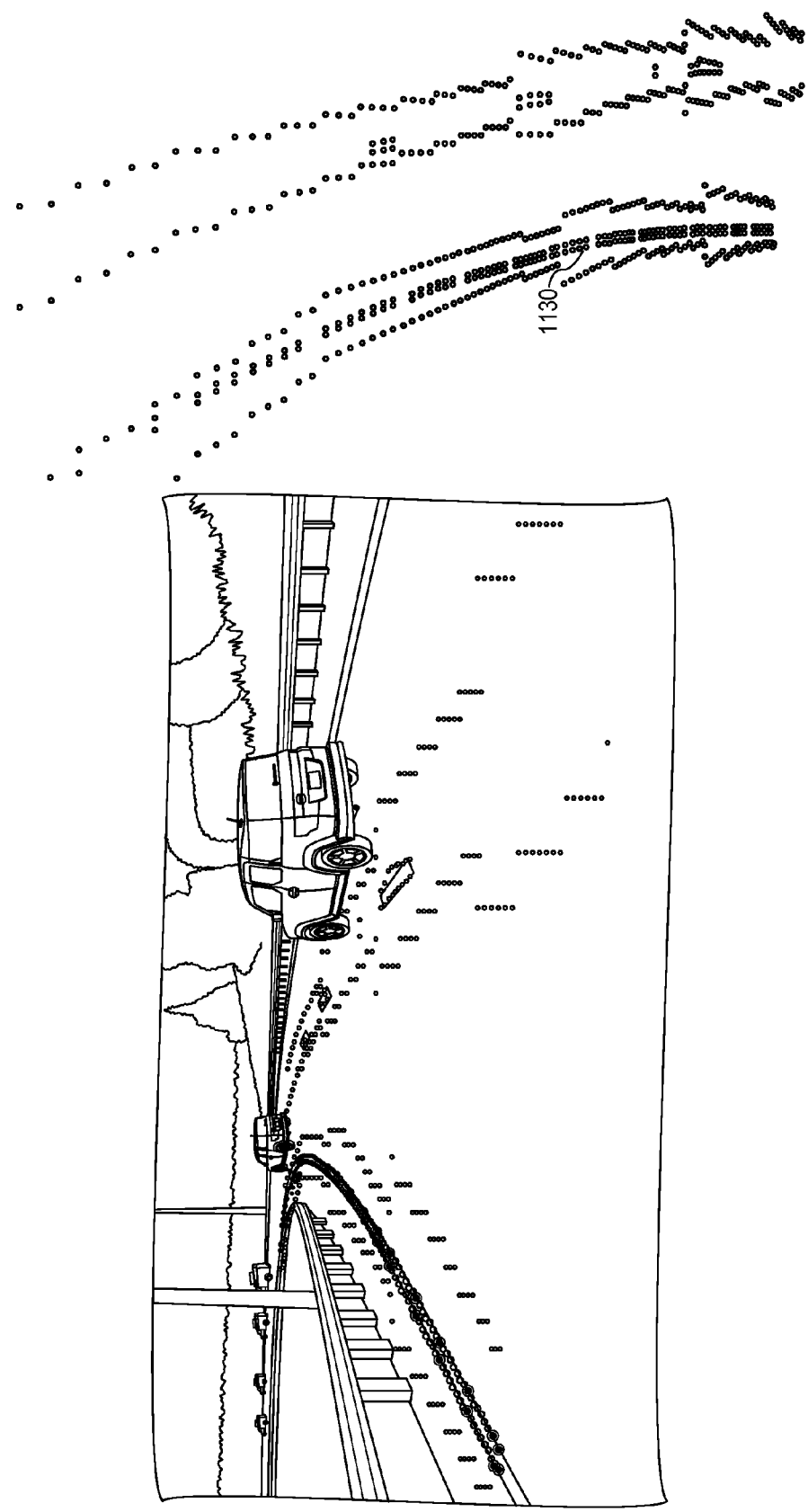
Figure 11E:
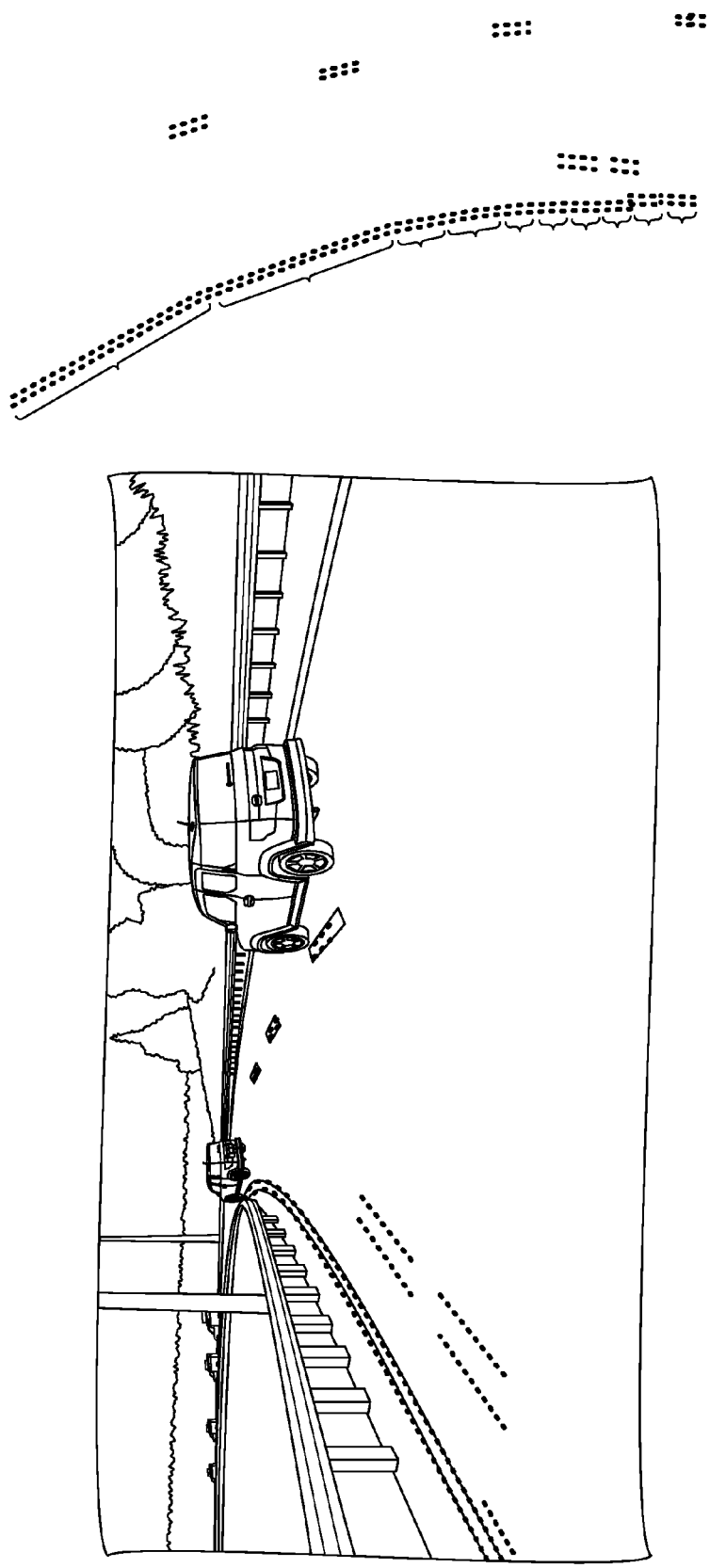

At step 1104, the detected RPPs may subsequently be clustered into sections, one of which is section 1130, as shown in FIG. 11D, and as indicated by the curly braces in FIG. 11E. The idea to use sections as an intermediate granularity object between local edge detections (e.g., edgelets) and the full lane mark "path" that is made up of a collection of segments. A key point is that the sections are locally linear one-sided objects, that can be made by clustering local edge detections and can be described compactly using a position and orientation (together with optional appearance attributes such as edge strength). This choice may make both forming the sections from local evidence possible and may allow the growing algorithm that connects the patch sections (described below) to treat them as atomic units with a simple parametric representation.

Figure 11F:
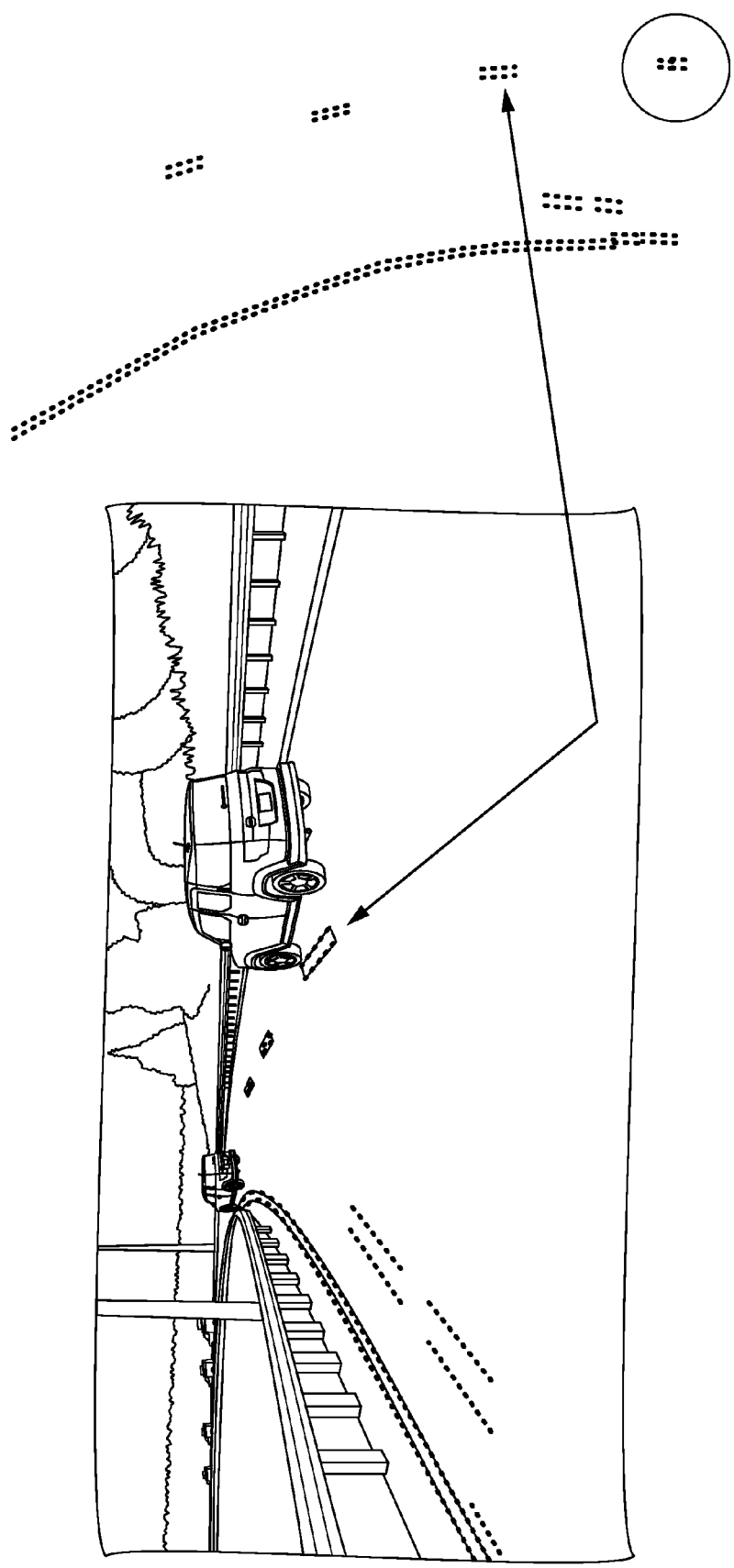

At step 1106, process 1100 may match the created sections to previous frame sections. As shown in FIG. 11F, the arrows indicate that a newly created section (on the right side of the image) matches to a previously modeled frame section (on the left side of the image). The circled section on the right side of the image indicates a section that was not matched to a previously modeled frame section.

Figure 11G:
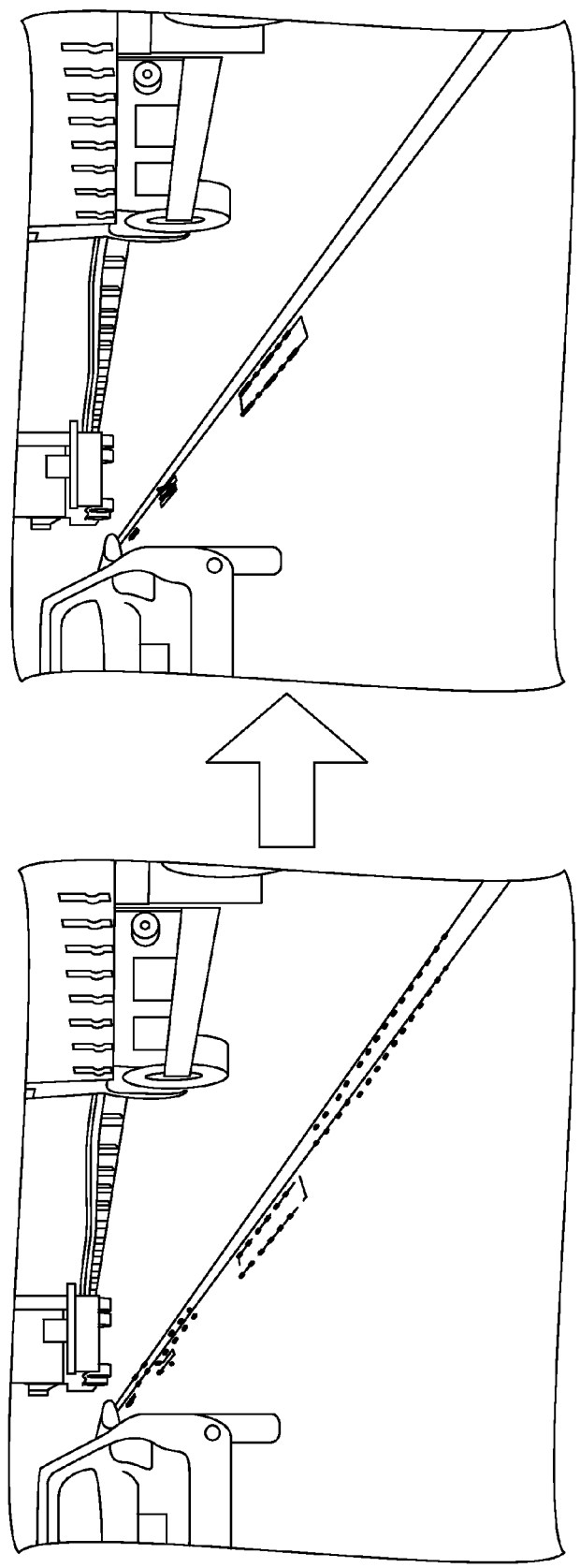

At step 1108, process 1100 may select the path sections to be connected into the best path for the lane markings. The image data in FIG. 11G is provided to illustrate how system 100 can start from the left image which comprises 7 candidate path sections (ordered from 1 to 7 from the bottom up) and end by selecting the best path (e.g., a combination of sections or candidate lane markings) as shown by the 3 section dashed line path in the right image.

To generalize the problem, the input comprises n sections (and a set of features on them) and the output comprises a path comprising a subset of k sections that best describe the lane marking. The optimal solution is too expensive because there are $2^n$ possible solutions. A few features may be used to make it run fast and yet allow paths that can split and merge. For example, the algorithm may run from bottom to top of image. Each current path end may try to find the next best section that continues it. If a section looks like a very good connection, it makes a greedy decision to connect, otherwise it continues to look for the best one. Additionally, a reverse process may find segments that were not chosen by paths from below and try to connect backwards to a good path that they connect well to, but happened not have been the best connection for that path when growing forward. This may allow for the finding of lane marking that split (e.g., around a traffic island).

Thus, the problem of the high cost of the optimal solution can be solved by defining a simpler problem and solving it by dynamic programming, which has $n^2$ in the worst case). An example dynamic programming algorithm follows:

Define the connection ends at section #1. (0–>1)
For each section i (=2:n),

Go over j (=0:i−1) previous sections,
  Define the path-section connection ends at j−>i
  Find the best connection ends at section i.

In other words, find the best path that ends at section k given the best paths that end at sections (1, . . . , k−1). The best path is then chosen by choosing the end section.

Figure 11H:
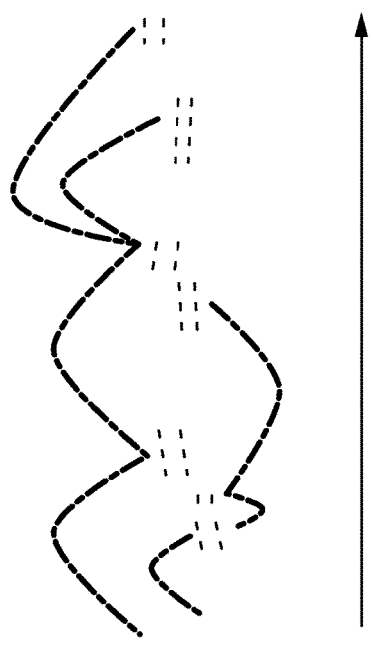
Figure 11I:
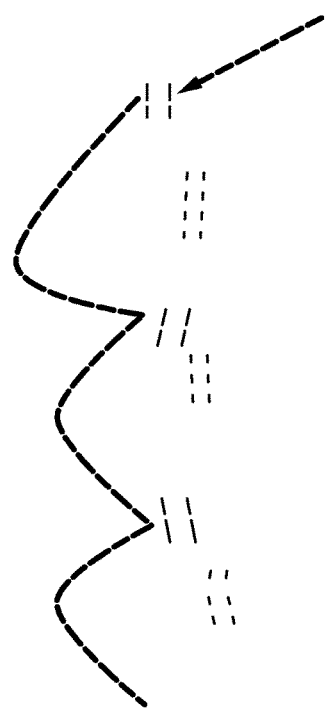
Figure 11J:
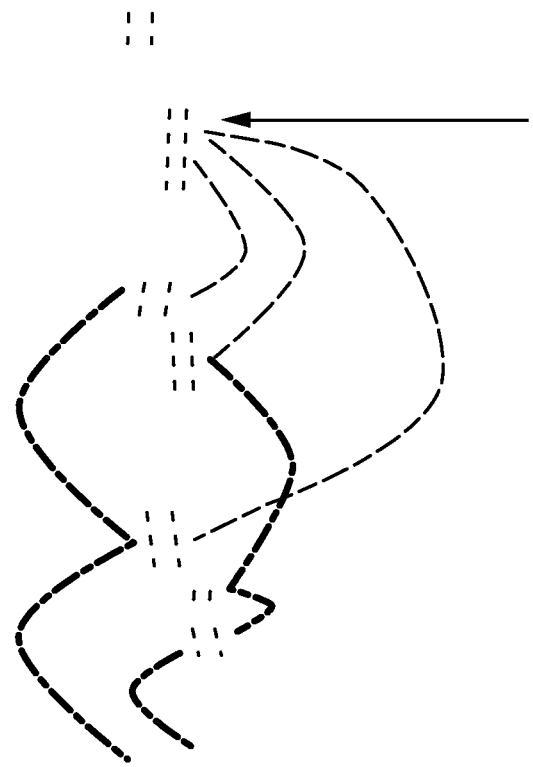

FIGS. 11H, 11I and 11J each show the same seven path sections that reflect the path section candidates for the dashed line of the roadway shown in the image of FIG. 11F. FIG. 11H shows the best paths (determined from the running of the dynamic programming algorithm) at each section, whereas FIG. 11I shows the best path for section 7 only. FIG. 11J shows part of the process of the algorithm when selecting section 6. This example shows connections being attempted between path section 6 and path sections 5, 4 and 3, respectively.

Figure 11K:
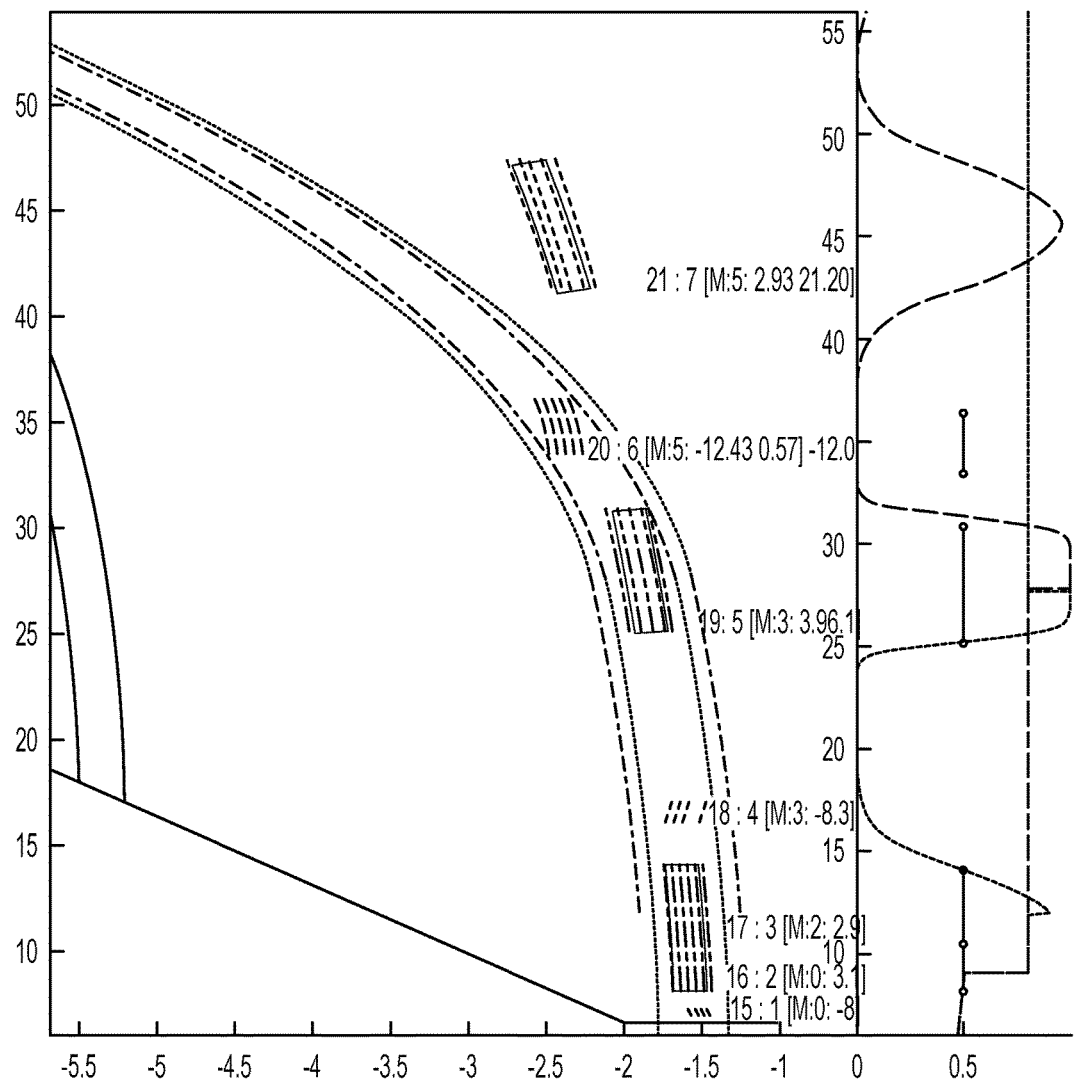
Figure 11L:
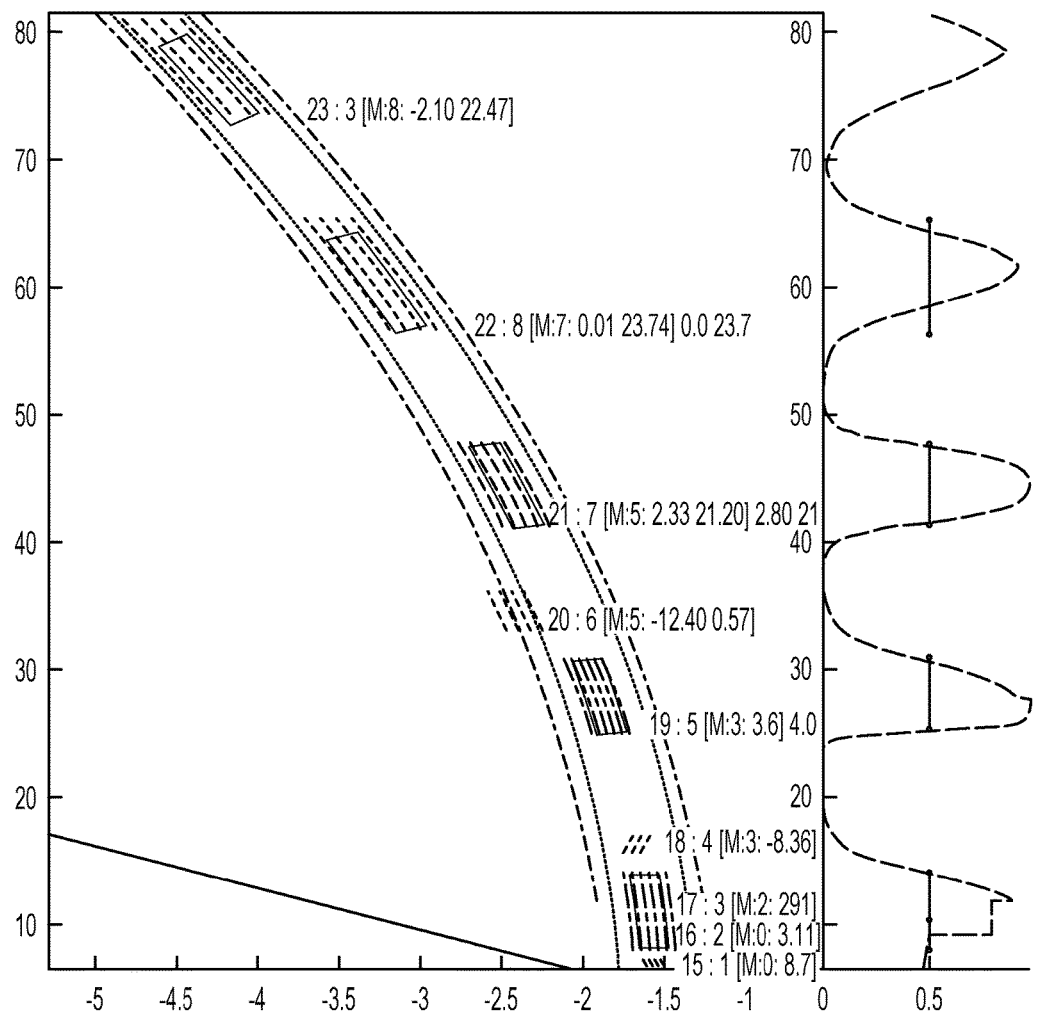

These tests may utilize any suitable number of classifiers, such as a step classifier, first classifier, terminal classifier, optimal classifier and path classifier. Features of the step classifier may include sec, sec-sec, and sec-paty, appearance features (e.g., brightness, width, edge sharpness, etc.), lateral-geometry (orientation, position, etc.) and longitudinal model (dash/solid-painted/gap lengths). The tests may also take into account one or more of appearance, spacing between sections and lateral position (spline). FIG. 11K shows an example where the attempted connecting of sections 19 and 20 fail because the lateral position test veers the path sharply to the left, whereas FIG. 11L shows the attempted connecting of sections 19 and 21 which passes, since it provides a better fit with the sections below it.

At step 1110, process 1100 may estimate line intensity model of the connected path sections. System 100 can sample several scan lines along the path, estimate the cross section model parameters from each sample, and average the results to get a single model per path.

Figure 11M:
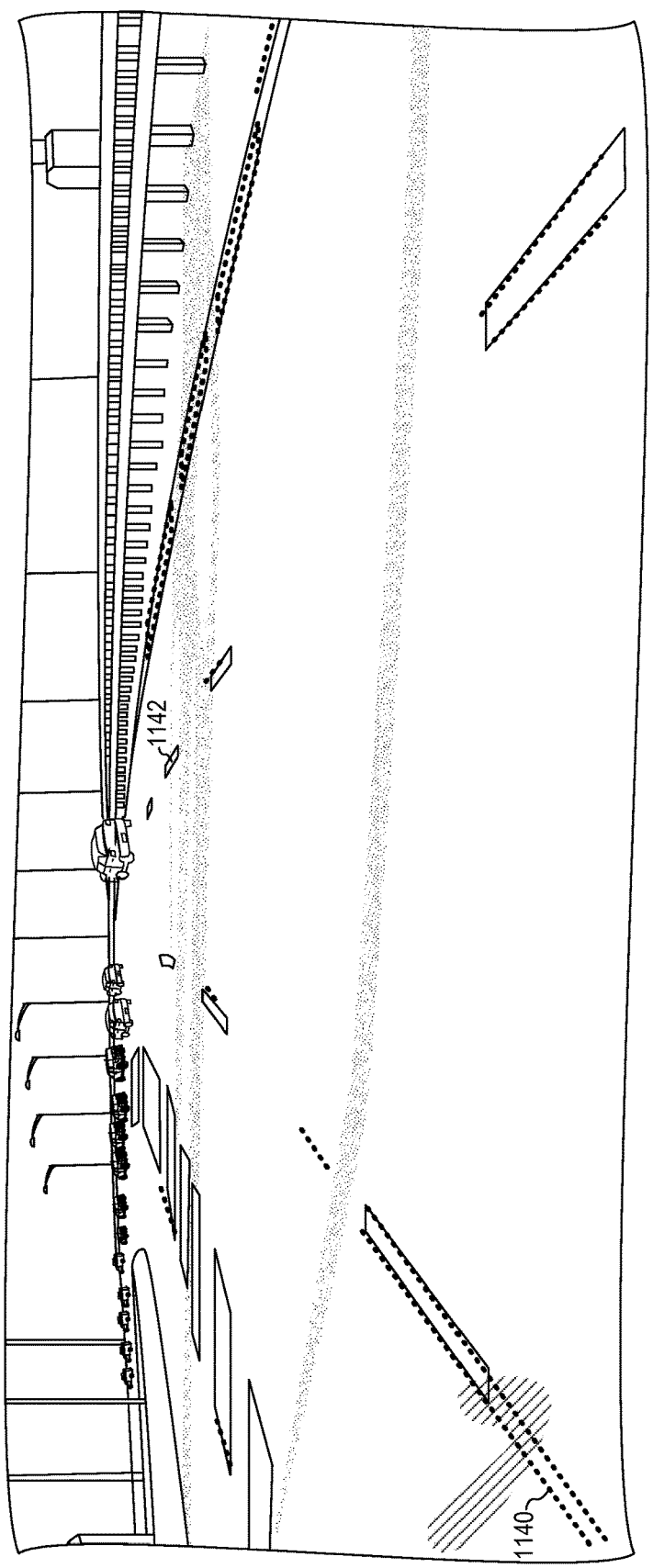
Figure 11N:
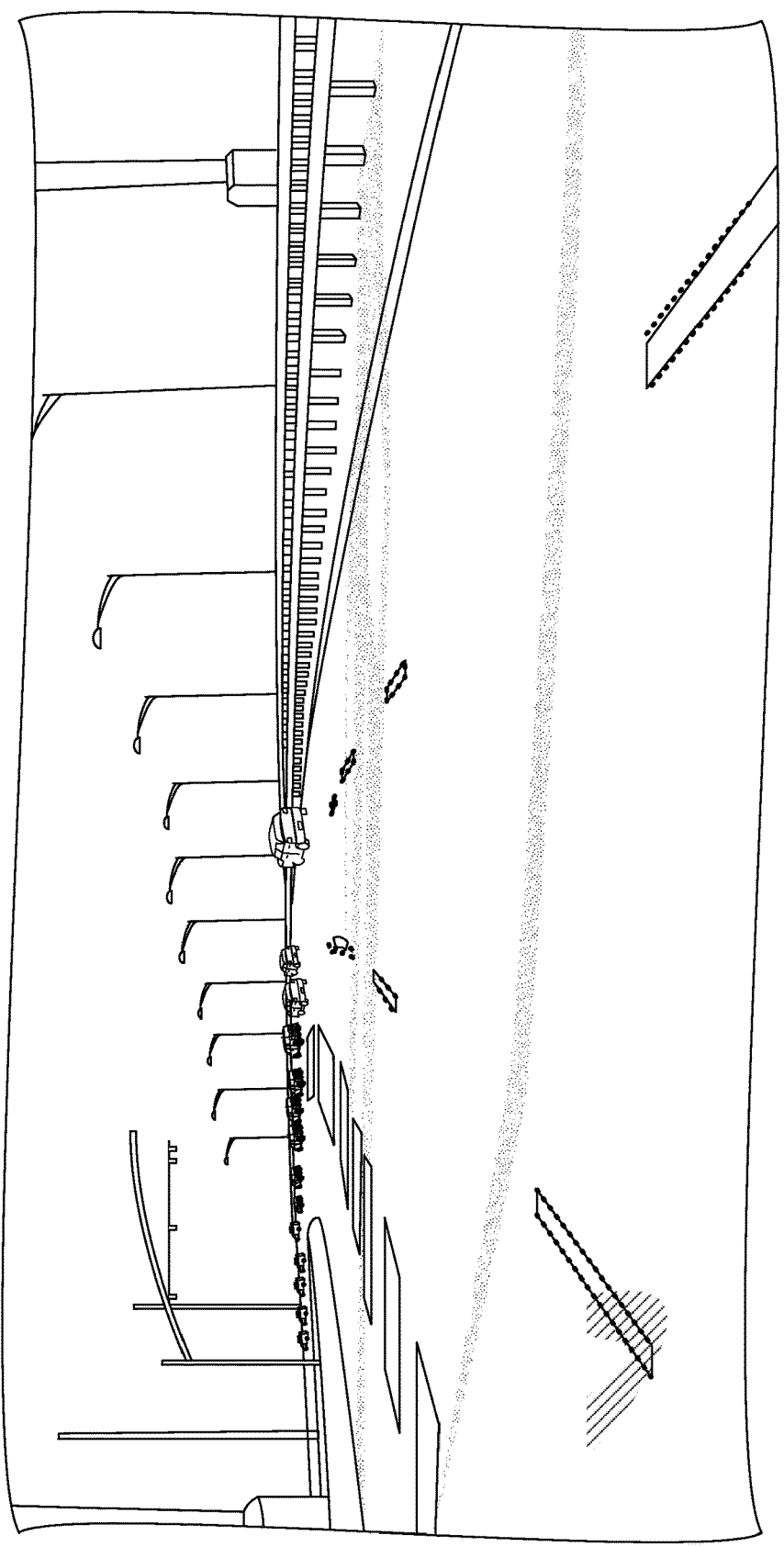

FIG. 11M shows the results of lane detection of the image data of FIG. 8C using a bottom-up detection system without top-down refinement. FIG. 11N shows the results of lane detection of the image data of FIG. 8C using system 100 with top-down refinement. As shown in FIG. 11M, the bottom-up detection system misses far dash marks such as dash 1142 and falsely detects glare on the windshield as lane mark 1140. However, FIG. 11N shows that with refinement these problems are resolved due to the use of the cross section model which matches the far dash marks and doesn't match the glare.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. Further, it is to be understood that the functionality of the program modules described herein is not limited to the particular type of program module named herein, but rather can be programmed in any suitable manner across among one or more modules or other software constructs.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer system comprising:
  one or more memories storing instructions; and
  one or more processors configured to execute the instructions to cause the system to:
    receive, from one or more cameras, one or more images of a roadway in a vicinity of a vehicle, the roadway comprising a lane marking comprising a dashed line;
    obtain a multi-frame model of the lane marking, wherein the multi-frame model of the lane marking includes a location for the lane marking at a first time;
    update the multi-frame model of the lane marking based on odometry of the one or more cameras relative to the roadway to obtain an updated multi-frame model of the lane marking, wherein the updated multi-frame model of the lane marking includes an estimated updated location for the lane marking at a second time;
    identify a plurality of candidate dashes from the received one or more images;
    calculate spacing information relating to spaces between the plurality of candidate dashes;
    perform a top-down modeling process to refine the updated multi-frame model of the lane marking at the updated location at the second time based on an appearance of dashes derived from the received one or more images and based on the calculated spacing information; and
    cause one or more navigational responses in the vehicle based on the refinement of the updated multi-frame model.

2. The computer system of claim 1, wherein the refinement of the updated multi-frame model is further based on a lateral position, relative to the roadway, of dashes derived from the received one or more images.

3. The computer system of claim 1, wherein the refinement of the updated multi-frame model is further based on existence of a parallel lane marking on one side of dashes derived from the received one or more images.

4. The computer system of claim 1, wherein the appearance of the dashes is based on a width of the dashes.

5. The computer system of claim 1, wherein the appearance of the dashes is based on a brightness of the dashes.

6. The computer system of claim 1, wherein the appearance of the dashes is based on an edge sharpness of the dashes.

7. The computer system of claim 1, wherein refining the updated multi-frame model of the lane marking based on an appearance of dashes derived from the received one or more images and based on the calculated spacing information comprises:
refining the updated multi-frame model using a dynamic programming technique.

8. The computer system of claim 1, wherein the one or more processors are configured to execute the instructions to cause the system to:
perform a bottom-up modeling process to generate a single-frame model of the lane marking based on a single frame of the received one or more images; and
match the generated single-frame model to the refined multi-frame model to approve the lane marking.

9. The computer system of claim 1, wherein the one or more one navigational responses comprises a steering of the vehicle.

10. The computer system of claim 1, wherein the one or more one navigational responses comprises an audible alert.

11. A vehicle, comprising:
a body;
one or more cameras configured to acquire one or more images of a roadway in a vicinity of a vehicle, the roadway comprising a lane marking comprising a dashed line;
one or more memories storing instructions; and
one or more processors configured to execute the instructions to cause the vehicle to:
receive, from one or more cameras, the one or more acquired images of the roadway;
obtain a multi-frame model of the lane marking, wherein the multi-frame model of the lane marking includes a location for the lane marking at a first time;
update the multi-frame model of the lane marking based on odometry of the one or more cameras relative to the roadway to obtain an updated multi-frame model of the lane marking, wherein the updated multi-frame model of the lane marking includes an estimated updated location for the lane marking at a second time;
identify a plurality of candidate dashes from the received one or more images;
calculate spacing information relating to spaces between the plurality of candidate dashes;
perform a top-down modeling process to refine the updated multi-frame model of the lane marking at the updated location at the second time based on an appearance of dashes derived from the received one or more images and based on the calculated spacing information; and
cause one or more navigational responses in the vehicle based on the refinement of the multi-frame updated model.

12. The vehicle of claim 11, wherein the refinement of the multi-frame updated model is further based on a lateral position, relative to the roadway, of dashes derived from the received one or more images.

13. The vehicle of claim 11, wherein the refinement of the multi-frame updated model is further based on existence of a parallel lane marking on one side of dashes derived from the received one or more images.

14. The vehicle of claim 11, wherein the appearance of the dashes is based on a width of the dashes.

15. The vehicle of claim 11, wherein the appearance of the dashes is based on a brightness of the dashes.

16. The vehicle of claim 11, wherein the appearance of the dashes is based on an edge sharpness of the dashes.

17. The vehicle of claim 11, wherein refining the updated multi-frame model of the lane marking based on an appearance of dashes derived from the received one or more images and based on the calculated spacing information comprises:
refining the updated multi-frame model using a dynamic programming technique.

18. The vehicle of claim 11, wherein the one or more processors are configured to execute the instructions to cause the vehicle to:
generate a model of the lane marking based on the received one or more images; and
match the generated model to the refined model to approve the lane marking.

19. The vehicle of claim 11, wherein the one or more one navigational responses comprises a steering of the vehicle.

20. The vehicle of claim 11, wherein the one or more one navigational responses comprises an audible alert.

21. A method comprising:
receiving, by one or more processors, from one or more cameras, one or more images of a roadway in a vicinity of a vehicle, the roadway comprising a lane marking comprising a dashed line;
obtaining a multi-frame model of the lane marking, wherein the model of the lane marking includes a location for the lane marking at a first time;
updating, by the one or more processors, the multi-frame model of the lane marking based on odometry of the one or more cameras relative to the roadway to obtain an updated multi-frame model of the lane marking, wherein the updated multi-frame model of the lane marking includes an estimated updated location for the lane marking at a second time;
identifying a plurality of candidate dashes from the received one or more images;
calculating spacing information relating to spaces between the plurality of candidate dashes;
performing a top-down modeling process to refine, by the one or more processors, the updated multi-frame model of the lane marking at the updated location at the second time based on an appearance of dashes derived from the received one or more images and based on the calculated spacing information; and
causing, by the one or more processors, one or more navigational responses in the vehicle based on the refinement of the updated multi-frame model.

22. The method of claim 21, wherein the refinement of the updated multi-frame model is further based on a lateral position, relative to the roadway, of dashes derived from the received one or more images.

* * * * *